(12) United States Patent
Cooper et al.

(10) Patent No.: US 7,773,205 B2
(45) Date of Patent: Aug. 10, 2010

(54) HIGH-RESOLUTION THREE-DIMENSIONAL IMAGING RADAR

(75) Inventors: Ken B. Cooper, La Canada, CA (US); Goutam Chattopadhyay, Pasadena, CA (US); Peter H. Siegel, La Canada, CA (US); Robert J. Dengler, Diamond Bar, CA (US); Erich T. Schlecht, Pasadena, CA (US); Imran Mehdi, South Pasadena, CA (US); Anders J. Skalare, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 231 days.

(21) Appl. No.: 12/135,040

(22) Filed: Jun. 6, 2008

(65) Prior Publication Data

US 2008/0304044 A1    Dec. 11, 2008

Related U.S. Application Data

(60) Provisional application No. 60/933,382, filed on Jun. 6, 2007, provisional application No. 60/959,301, filed on Jul. 12, 2007.

(51) Int. Cl.
*G01C 3/08* (2006.01)
*G01S 13/28* (2006.01)

(52) U.S. Cl. .................................. 356/5.15; 342/132
(58) Field of Classification Search ............... 356/5.15; 342/127, 128, 132, 195, 196
See application file for complete search history.

(56) References Cited

U.S. PATENT DOCUMENTS

| | | | |
|---|---|---|---|
| 4,743,110 A * | 5/1988 | Arnaud et al. | ............ 356/5.09 |
| 5,455,590 A | 10/1995 | Collins et al. | |
| 5,557,283 A | 9/1996 | Sheen et al. | |
| 5,627,543 A * | 5/1997 | Moreira | ................... 342/25 A |
| 5,859,609 A | 1/1999 | Sheen et al. | |
| 6,507,309 B2 | 1/2003 | McMakin et al. | |
| 6,703,964 B2 | 3/2004 | McMakin et al. | |
| 6,876,322 B2 | 4/2005 | Keller | |
| 7,312,855 B1 * | 12/2007 | Hintz et al. | ................ 356/4.01 |

(Continued)

OTHER PUBLICATIONS

Mittleman et al., "Recent advances in terahertz imaging," Appl. Phys. B 68, 1085-1094, 1999, Springer-Verlag.

(Continued)

*Primary Examiner*—Isam Alsomiri
(74) *Attorney, Agent, or Firm*—Canady & Lortz LLP; Bradley K. Lortz

(57) ABSTRACT

A three-dimensional imaging radar operating at high frequency e.g., 670 GHz, is disclosed. The active target illumination inherent in radar solves the problem of low signal power and narrow-band detection by using submillimeter heterodyne mixer receivers. A submillimeter imaging radar may use low phase-noise synthesizers and a fast chirper to generate a frequency-modulated continuous-wave (FMCW) waveform. Three-dimensional images are generated through range information derived for each pixel scanned over a target. A peak finding algorithm may be used in processing for each pixel to differentiate material layers of the target. Improved focusing is achieved through a compensation signal sampled from a point source calibration target and applied to received signals from active targets prior to FFT-based range compression to extract and display high-resolution target images. Such an imaging radar has particular application in detecting concealed weapons or contraband.

24 Claims, 13 Drawing Sheets

U.S. PATENT DOCUMENTS

| | | |
|---|---|---|
| 7,342,651 B1 * | 3/2008 | Woolfson .................... 356/28 |
| 7,345,279 B2 | 3/2008 | Mueller |
| 2004/0090359 A1 | 5/2004 | McMakin et al. |
| 2004/0140924 A1 | 7/2004 | Keller et al. |
| 2006/0066469 A1 | 3/2006 | Foote et al. |
| 2006/0139620 A1 * | 6/2006 | Hopwood et al. .......... 356/5.15 |
| 2006/0214107 A1 | 9/2006 | Mueller |

OTHER PUBLICATIONS

McMillan, "Terahertz Imaging Millimeter-Wave Radar," Advances in Sensing with Security Applications Digest, NATO Advanced Study Institute, II Ciocco Italy, pp. 1-26, Jul. 2005.

* cited by examiner

HIGH-RESOLUTION THREE-DIMENSIONAL IMAGING RADAR

CROSS-REFERENCE TO RELATED APPLICATIONS

This application claims the benefit under 35 U.S.C. §119 (e) of the following U.S. provisional patent applications, which are both incorporated by reference herein:

U.S. Provisional Patent Application No. 60/933,382, filed Jun. 6, 2007, and entitled "600 GHZ HIGH-RESOLUTION RADAR", by Cooper et al.; and U.S. Provisional Patent Application No. 60/959,301, filed Jul. 12, 2007, and entitled "600 GHZ HIGH-RESOLUTION RADAR", by Cooper et al.

STATEMENT OF GOVERNMENT RIGHTS

The invention described herein was made in the performance of work under a NASA contract, and is subject to the provisions of Public Law 96-517 (35 U.S.C. 202) in which the Contractor has elected to retain title.

BACKGROUND OF THE INVENTION

1. Field of the Invention

This invention relates to imaging radar systems. Particularly, this invention relates to high frequency real aperture three-dimensional radar imaging systems.

2. Description of the Related Art

Numerous commercial technologies can detect weapons or contraband concealed in clothing on persons—from trace chemical sniffers to X-ray imagers—but in almost all cases these approaches require the sensor and the target to be in close proximity. For situations that call for remote detection, such as when hidden explosives may be detonated or where clandestine surveillance is warranted, concealed weapons detection is at best extremely difficult to accomplish.

Conventional radars are being widely investigated for this purpose, but stringent spatial resolution requirements make these systems impractical because of the large bandwidths and aperture sizes needed. Traditional radar systems are also poorly suited for spectroscopic identification of materials such as explosives. Some progress in through-clothing imaging has been reported using passive thermal detectors in the submillimeter spectrum, but these approaches are lacking in sensitivity and spectral selectivity.

Among the conventional detection systems employing radar techniques for human targets, many operate only by detecting power of a beam reflected off a target. Such radar detection systems infer a characteristic of the object reflecting power from a location compared against reflected power from other locations in a two-dimensional scan. Radar detection systems operating in this manner typically do not derive or utilize range information across the target object (the person). Thus, such radar systems operating based on reflected power alone are not three-dimensional imaging systems. In contrast, radar imaging systems employ derived range information to a target, typically ignoring reflected power. However, effective three-dimensional radar imaging systems can be difficult to produce. Imaging technology in the THz range has primarily focused on acquiring two-dimensional camera-like representations of a scene. However, additional utility would come from a fully three-dimensional imaging radar with high range resolution.

Recent progress in terahertz (THz) technology, as well as the demand for new surveillance capabilities, has led to the development of prototype submillimeter imagers capable of detecting weapons concealed within clothing or packages. See, e.g. McMillan, "Terahertz Imaging Millimeter-Wave Radar," Advances in Sensing with Security Applications Digest, NATO Advanced Study Institute, II Ciocco Italy, pp. 1-26, Jul. 17-30, 2005 (http://w.nato-asi.org/sensors2005/papers/mcmillan.pdf); Dengler, "Passive and Active Imaging of Humans for Contraband Detection at 610 GHz," 2004 IEEE MTT-S Intl. Microwave Sym. Digest, Ft. Worth, Tex., June 2004, pp. 1591-1594; Petkie et al., "Active and passive millimeter and sub-millimeter-wave imaging" Proc. SPIE, vol. 5989, pp. 598918-1 to 598918-8, 2005; Dickinson et al., "Terahertz imaging of subjects with concealed weapons," Proc. SPIE, vol. 6212, pp. 62120Q-1 to 62120Q-12, 2006; Kemp et al., "Security applications of terahertz technology," Proc. SPIE, vol. 5070, pp. 44-52.2003; and Dengler et al., "A Compact 600 GHz Electronically Tunable Vector Measurement System for Submillimeter Wave Imaging," 2006, IEEE MTT-S Intl. Microwave Symp. Digest, San Francisco, Calif., June 2006, pp. 1923-1926, which are all incorporated by reference herein. Imaging in the THz regime is attractive because wavelengths in the range 100 µm<$\lambda$<0.5 mm are short enough to provide high resolution with modest apertures and long enough to penetrate materials such as cloth or cardboard.

With the ability to penetrate clothing, the potential for cm-scale image resolution, and SNR in excess of $10^6$, it is no wonder that active (illuminated) submillimeter-wavelength imaging has attracted great interest for standoff weapons detection. However, substantial sensitivity and good resolution are insufficient to reliably detect concealed objects. Current approaches to THz imaging do not yet meet all of the real-world and often conflicting requirements of standoff range, portability, high speed, penetrability, target identification, and cost.

U.S. Pat. No. 7,345,279 by Mueller, issued Mar. 18, 2008 discloses a method for inspecting a package to identify an object concealed in the package includes passing two beams of THz-radiation through the package. The frequency of THz radiation in one beam is different from that in the other, and the beams are at an angle to each other. Each of the transmitted beams is used to form an image of the package and the object. The absorption coefficient of the object is determined from the two images. The material of the object is determined from the absorption coefficients at the two frequencies. The method is useful for detecting explosive material concealed in baggage.

U.S. Patent Publication No. 20060214107 by Mueller, published Sep. 28, 2008 discloses a THz-frequency heterodyne imaging method is used to remotely detect objects concealed in or under a person's clothing. One THz-frequency beam is scanned over a person being examined. A portion of the beam penetrates the persons clothing and is reflected by an object concealed under the person's clothing. The reflected portion the beam is mixed with another beam of THz-frequency radiation having a different frequency to provide a signal having an intermediate frequency (IF) including image data representative of the concealed object.

Mueller employs THz radiation is generated through optical pumping of a $CO_2$ laser, and a heterodyne detection technique is used to measure the reflected signal. Because of the ability for THz to penetrate clothing, Mueller speculates that hidden contraband can be detected based on the downconverted signal. Mueller also speculates that high-resolution radar techniques would assist in detecting hidden objects, and a frequency-modulated continuous-wave (FMCW) radar technique is proposed to accomplish that. However, no algorithmic description explaining how radar data is to be used for object detection is given, and no methods of FM-chirp nonlinearity compensation are described.

In real-life scenarios a coherent radar image will typically exhibit very poor contrast between a concealed object and the surrounding clothing and skin—even for hidden metallic objects such as guns. The challenge of actively illuminated submillimeter wave detection of concealed objects involves extracting signals from scene clutter rather than from noise. For example, while active THz imaging systems using high power coherent illumination and ultra-low-noise heterodyne detection show great promise, they often face operational drawbacks such as requiring cryogenic detectors or bulky laser sources. A more fundamental difficulty with coherent active imaging is that by relying on a single frequency, target recognition is reliant on an object's contrast and brightness which, in turn, are highly sensitive to incidence angle of radiation, clutter signal from the foreground or background, and interference and speckle effects.

In view of the foregoing, there is a need in the art for apparatuses and methods for high frequency radar providing three-dimensional imaging with high range resolution. There is also a need for such apparatuses and methods employing long standoff range, speed and penetrability. There is a need for such apparatuses and methods to operate with reduced sensitivity to incidence angle of radiation, clutter signal from the foreground or background, and interference and speckle effects, indicative of other imagers. There is further a need for such apparatuses and methods to operate allow conceal target identification at reasonable cost. There is particularly a need for such apparatuses and methods in security applications to detect concealed weapons and explosives on individuals. These and other needs are met by the present invention as detailed hereafter.

SUMMARY OF THE INVENTION

Embodiments of the invention are directed to a three-dimensional imaging radar operating at high frequency, e.g. 670 GHz. At such high frequencies, centimeter-scale spatial resolution in three dimensions is possible without excessively large fractional bandwidths or aperture sizes. The active target illumination inherent in radar ensures high signal power provides for spectroscopic flexibility. A submillimeter imaging radar may use low phase-noise synthesizers and a fast microwave chirp-generator to produce a frequency-modulated continuous-wave (FMCW) waveform. Three-dimensional images are generated through range information derived for each pixel scanned over a target. A peak finding algorithm may be used in processing for each pixel to differentiate material layers of the target. Improved focusing is achieved through a compensation signal sampled from a point source calibration target and applied to received signals from targets prior to FFT-based range compression to extract and display high-resolution target images. Such an imaging radar has particular application in detecting concealed weapons or contraband.

A typical embodiment of the invention comprises a first wave Synthesizer source for generating a frequency modulated continuous wave (FMCW) chirp signal, a second wave synthesizer source for generating a FMCW local oscillator "chirp" signal, an optical device for directing (including focusing as necessary) the FMCW chirp signal onto a target and for receiving the reflected FMCW chirp signal from the target, a first frequency mixer for combining the reflected FMCW chirp signal and the FMCW local oscillator chirp signal to generate a first intermediate frequency (IF) signal, a second mixer for combining the source signal and the source local oscillator signal to generate a second IF signal, a third mixer for combining the first IF signal and the second IF signal to generate a final IF signal, and a digital signal processor system for performing fast Fourier transform (FFT) processing on the final IF signal to extract range information for the target. In addition, a calibration signal is derived from the reflection off a point source test target, and the response is applied to the final IF signal prior to FFT processing, to significantly reduce the error in the range information for the real target. The FMCW chirp signal directed to the target and the reflected FMCW chirp signal from the target may be co-aligned, e.g. employing appropriate optics. The FMCW chirp signal, the FMCW local oscillator chirp signal and the local oscillator for the second mixer may each be generated with one or more frequency multipliers, e.g., Schottky diode multipliers. The optical device may be a beamsplitter.

The second mixer captures frequency drifts between the two synthesizers by mixing portions of their signals obtained with directional couplers which may then be compensated for at the final IF mixing stage. The first and second IF signals may have substantially identical frequencies, e.g., 500 MHz.

A complete digital signal processor system may be used for performing chirp-nonlinearity compensation, fast Fourier transform (FFT), peak detection, and signal processing of the final IF signal to determine range information for the target resulting in nearly perfectly bandwidth-limited range resolution of the detected signal. The FMCW transmit signal and the FMCW local oscillator signal may be generated by frequency-multiplication of sources produced using generic microwave synthesizers. Frequency multiplication may be effected using Schottky diode multipliers. The optical device may comprise a free-space beamsplitter or a waveguide hybrid coupler, and a reflecting or diffractive focusing lens or any other suitable optical device known to those skilled in the art.

Using the system, a three dimensional map of the target may be derived from the range information determined for each of multiple pixels scanned over the target. A peak-finding algorithm may be applied to the determined range information to differentiate material layers of the target. Thus, concealed opaque weapons, contraband, or objects may be identified as anomalies in the apparent topography of the final non-penetrable surface, usually a person's skin, that is encountered by the beam.

The optical device may comprise a reflector coupled to a two-axis rotation stage and the range information may be determined by positioning the two-axis rotation stage for each of the multiple pixels scanned over the target with the reflector directing the FMCW chirp signal from the reflector to be reflected off a target and received from the target.

Some embodiments of the invention may further comprise a waveform generator generating a common chirp signal. The first wave synthesizer generates the frequency modulated continuous wave (FMCW) chirp signal from the source signal mixed with the common chirp signal and the second wave synthesizer generates the FMCW local oscillator chirp signal from the source local oscillator signal mixed with the common chirp signal.

In some embodiments of the invention, the third mixer may comprise an in-phase quadrature (IQ) mixer. One or more of the first wave synthesizer and the second wave synthesizer may comprise an yttrium iron garnet (YIG) synthesizer, a voltage controlled oscillator (VCO), and/or a direct digital synthesis/phase-lock loop (DSS/PLL) synthesizer. In addition, one or more of the first mixer, the second mixer and the third mixer may comprise a Schottky mixer.

In a similar manner, a typical method of determining range information, comprises generating a frequency modulated continuous wave (FMCW) chirp signal from a source signal using a first wave synthesizer, generating a FMCW local oscillator chirp signal from a source local oscillator signal using a second wave synthesizer, directing the FMCW chirp signal to be reflected off a target and receiving the reflected FMCW chirp signal from the target using an optical device, combining the reflected FMCW chirp signal and the FMCW local oscillator chirp signal to generate a first intermediate frequency (IF) signal using a first mixer, combining the source signal and the source local oscillator signal to generate a second IF signal using a second mixer, combining the first IF signal and the second IF signal to generate a final IF signal using a third mixer, applying a compensation signal derived from a point source test target response to the final IF signal prior to FFT processing, and performing fast Fourier transform (FFT) processing on the final IF signal to determine range information for the target using a digital signal processor system. Method embodiments of the invention may be further modified consistent with the apparatuses and systems described herein.

BRIEF DESCRIPTION OF THE DRAWINGS

Referring now to the drawings in which like reference numbers represent corresponding parts throughout:

FIGS. 8A and 8B use mapping of reflected intensity, but no ranging—a hidden object is difficult to distinguish. FIGS. 8D and 8E illustrate how the ranging capability of the radar can distinguish between reflections off fabric (a shirt) and those off the surfaces hidden by that shirt, so that hidden objects can be unmasked (in this case a handgun).

DETAILED DESCRIPTION OF THE PREFERRED EMBODIMENT

1. Overview

An imaging radar is described that operates at submillimeter wavelengths for applications ranging from concealed weapons detection to planetary trace-chemical identification. Unlike conventional radars, which typically operate below 100 GHz (i.e., wavelengths greater than approximately 3 mm), a system operating well above this, e.g., 670 GHz, is capable of very high imaging resolution in three dimensions because since its high modulation bandwidth gives higher range resolution and its shorter wavelength gives higher lateral image resolution for any fixed antenna aperture size. Using a novel signal generation architecture, the submillimeter radar is capable of quickly, quietly, and linearly frequency-sweep over a bandwidth of 18 GHz, thus permitting an ultra-high range resolution of less than 1 cm. With an aperture size of 50 cm, the radar is also able to resolve targets within 2 cm at stand-off distances of 25 m. In addition, the submillimeter radar is novel because it has the potential to acquire spectroscopic information from targets for distinguishing their materials characteristics or chemical composition. Finally, owing to its all solid-state implementation, this technology is scalable to a fast, compact multipixel imaging system capable of three-dimensional imaging.

Embodiments of the invention implement an ultra-broadband submillimeter-wave radar capable of mapping a person at the cm scale in three dimensions. Using the described techniques, high-resolution three-dimensional images can be generated, removing the clutter signals to reveal hidden objects at standoff ranges of 4 and 25 m. Such systems can be readily scaled to larger standoff ranges. However, increasing system speed to near-real-time frame rates may require further effort to develop a multi-pixel imaging radar array.

Figure 1:
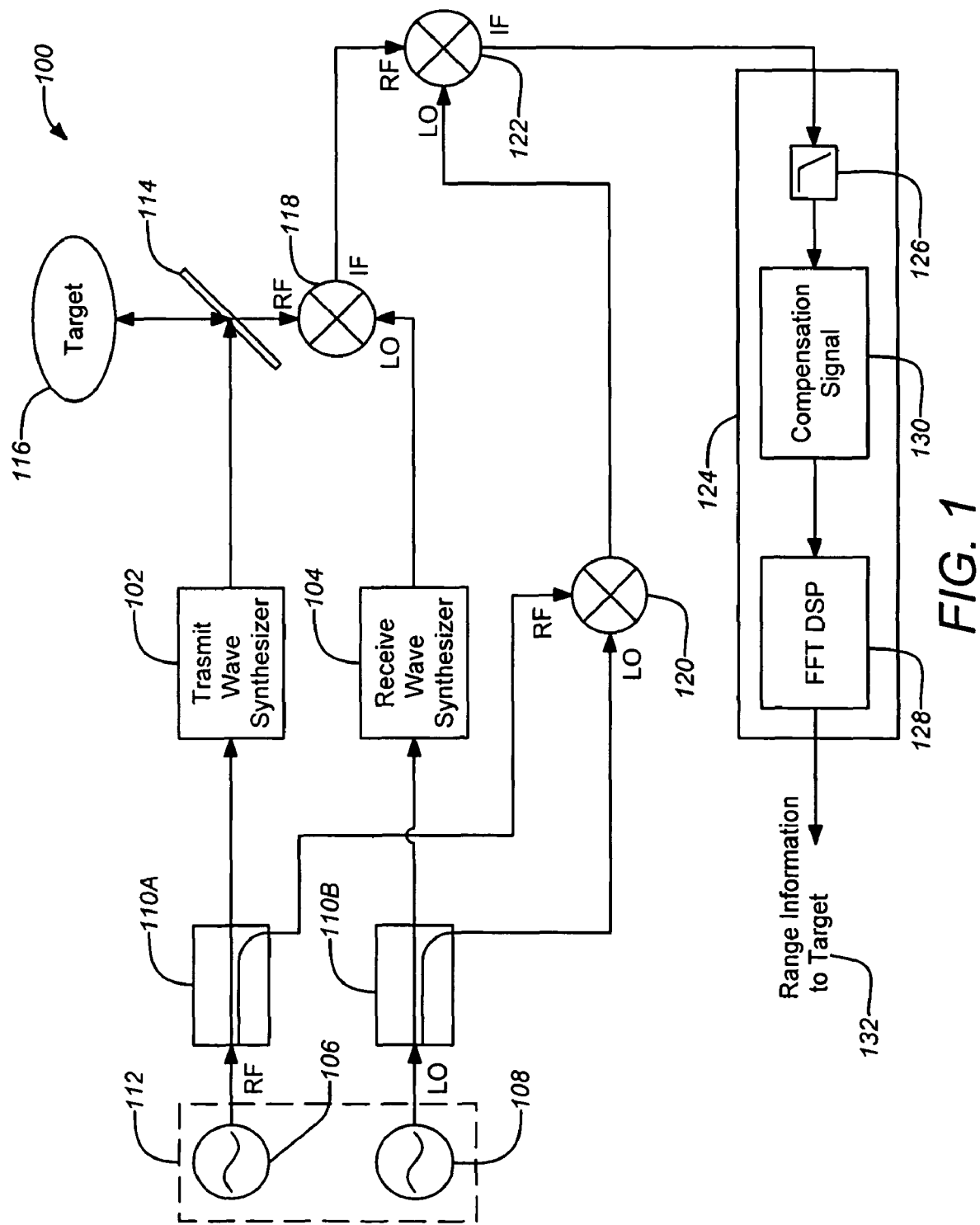
FIG. 1 is a block diagram of an exemplary three dimensional imaging radar system embodiment of the invention.

FIG. 1 is a block diagram of an exemplary three dimensional imaging radar system 100 embodiment of the invention. This simplified diagram eliminates necessary frequency multipliers and amplifiers to better illustrate general function of the radar. Location and type of filters, frequency multipliers and amplifiers are variable and depend upon a particular system design as will be understood by those skilled in the art. The system 100 employs a transmit wave synthesizer 102 for generating a frequency modulated continuous wave (FMCW) chirp signal based on a source signal. The final FMCW chirp signal is smoothly chirped in frequency over a wide bandwidth and output at high frequency, e.g. 560 GHz. A receive wave synthesizer 104 generates a FMCW local oscillator chirp signal from a source local oscillator (LO) signal. Note that the transmit wave synthesizer 102 and the receive wave synthesizer 104 may be combined in a single device. The source signal and the source LO signal may be generated through different techniques, e.g. from separate waveform generators 106, 108 or a common waveform generator unit 112, as will be described hereafter.

The output FMCW chirp signal is directed to the target 116 by an appropriate optical device 114, e.g., comprising a beamsplitter and one or more lenses. The FMCW chirp signal is reflected of the target 116 and returns to a first mixer 118 to be combined with the FMCW local oscillator chirp signal from the receive wave synthesizer 104 and yield a first intermediate frequency (IF) signal. Both the source signal 106 and the source LO signal 108 are tapped (at signal taps 110A, 110B, respectively) and mixed in a second mixer 120 to yield a second IF signal. A third mixer 122 is then used to combine the first IF signal and the second IF signal to generate a final IF signal.

Processing may be performed by a digital signal processor system 124 which digitizes 126 the final IF signal and performs fast Fourier transform (FFT) processing 128 on the digitized final IF signal to determine range information 132 for the target 116. An important feature of the present invention is a compensation signal 130 derived from a point source test target response which is applied to the final IF signal prior to FFT processing 128 to focus the determined range in formation 132 for the target 116. Details of the operations and processes are described hereafter in various example embodiments of the invention.

2. Focusing Target with an Example Radar System

Figure 2A:
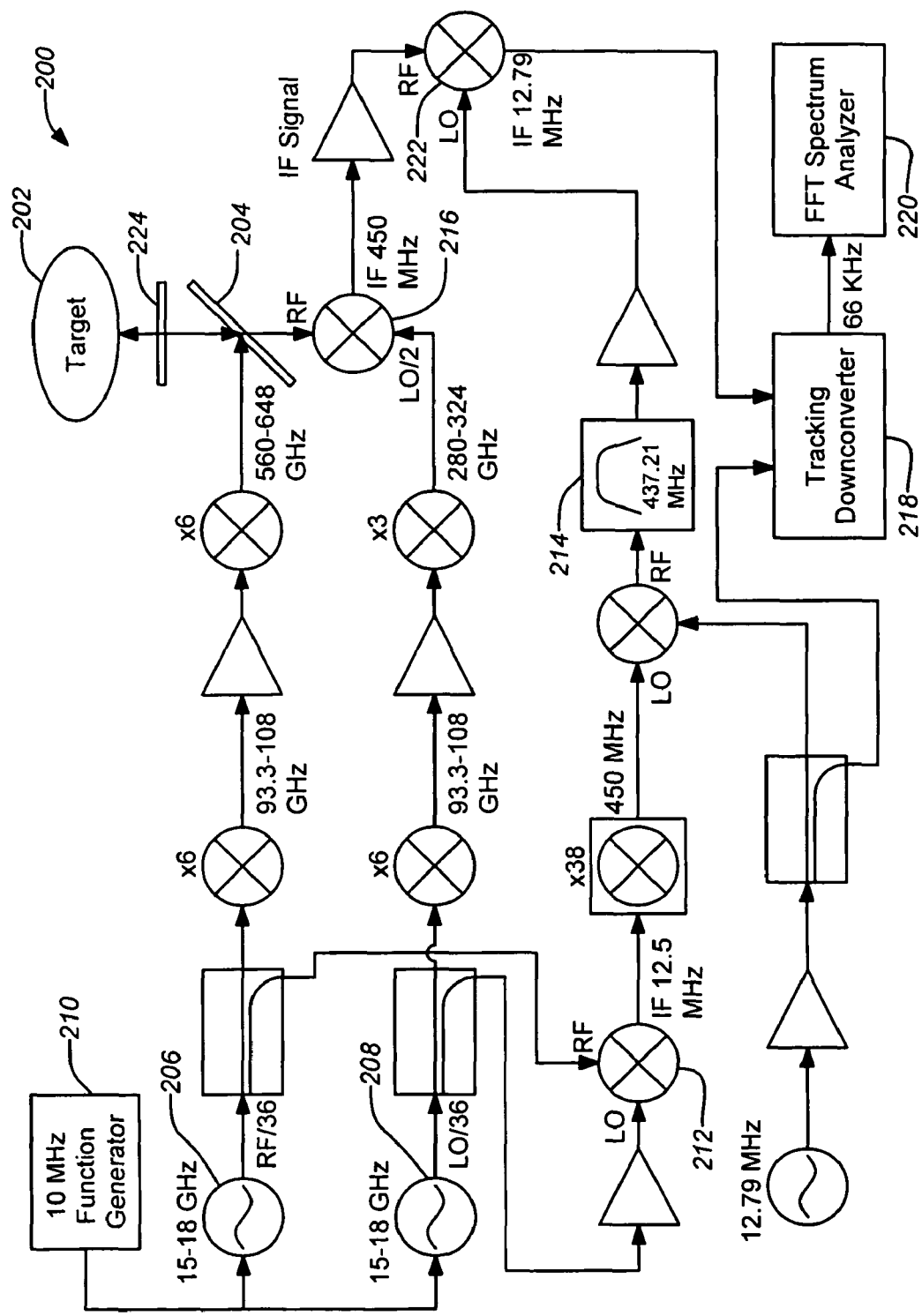
FIG. 2A illustrates frequency bands and system components in an example radar system in accordance with the present invention.

FIG. 2A illustrates focusing targets in an example radar system 200 in accordance with the present invention. The submillimeter radar system 200 is modification and extension of the vector imager system described in Dengler et al., "A Compact 600 GHz Electronically Tunable Vector Measurement System for Submillimeter Wave Imaging," 2006 IEEE MTT-S Intl. Microwave Sym. Digest, San Francisco, Calif., June 2006, pp. 1923-1926, (Dengler), which is incorporated by reference herein. Operation of the example system 200 is consistent with operation of the system 100 described in FIG. 1 and illustrates the radar principle including focusing of the range information for the target 202. To interfere and measure signals reflected from a target 202, a beamsplitter 204 may be used to co-align the transmit and receive beams through a 20 cm diameter Teflon Fresnel lens 224. For example, this lens 224 may focus the beams from the transmitter and receiver feedhorns down to a spot size of approximately 1 cm at a range of approximately 4 m, where a small mirror may be used as the target 202.

While the lateral cross-range resolution of a radar/imager system 200 is determined primarily by the lens diameter and the target distance, the range resolution has a theoretical limit determined by the bandwidth of the transmitted signal. In the applied frequency-modulated continuous-wave (FMCW) radar technique, the transmit waveform must be smoothly chirped in frequency over a wide span (bandwidth) $\Delta F$ of approximately 15 GHz to reach approximately 1 cm-scale resolution in this example. Description of the FMCW radar technique may be found in Wehner, "High-Resolution Radar," Artech House, Boston 1995, which is incorporated by reference herein. Achieving a smooth chirp seems incompatible with the vector imager system 200 using Micro Lambda Wireless MLSL synthesizers (transmit wave synthesizer 206 and receive wave synthesizer 208) having a minimum step size of 125 kHz (corresponding to 9 MHz after multiplication). However, continuous and highly linear chirps can still be generated by frequency modulating the synthesizers' 10 MHz reference input with a waveform generator 210 such as an Agilent 33220A arbitrary waveform generator. The MLSL synthesizers 206, 208 have a loop bandwidth of only approximately 10 Hz, so in order to maintain phase lock the chirp rate needs to be kept quite low. The maximum possible chirp rate may be found through experimentation, e.g. approximately 20 GHz per second in the example system 200.

To preserve the phase noise-canceling characteristic of the vector measurement system 200, it may be necessary to feed the same swept reference signal to both synthesizers 206, 208. Because of the different multiplication factors in the RF and LO synthesizers 206, 208, some chirp is still present in the 1$^{st}$ intermediate frequency (IF) signal (at approximately 450 MHz) which is frequency multiplied ×38 from the second mixer 212. As a result, the chirp span may be limited by the 437.21 MHz bandpass filter 214 in the noise cancellation stage (applied in the second mixer 222), which has a 3 dB bandwidth of 8 MHz and a rejection of over 100 dB at 9 MHz beyond the band edges. This limits the maximum final transmit FMCW bandwidth to about 8 GHz.

After downconverting 218 to the final IF frequency of approximately 66 kHz, the deramped signal may be recovered using a Measurement Computing PCI-DAS6034 card in place of the lock-in amplifier described in Dengler. Digital signal processing of the IF signal, such as range compression using the fast Fourier transform (FFT) algorithm 220, may be implemented using software such as Labview and Matlab.

Transmitter power and LO power for the heterodyne receiver are derived from custom W-band MMIC power amplifier modules and frequency multiplier chains comprising doublers and triplers as shown in FIG. 2A from the synthesizers 206, 208. These components have been described elsewhere. See, Dengler. In order to maximize output power, the 200, 300 and 600 GHz multipliers may all be operated at their optimum safe operating bias and input power levels. Because the gain of the 100 GHz power amplifiers feeding the multipliers varies widely with frequency, a lookup table may be used to adjust the supply voltage to the amplifiers at every operating frequency. To protect the multipliers from damage in the event of the synthesizers unlocking from the chirped 10 MHz reference, a software control loop may be used to shut down the amplifier power supply in the event of an unexpected unlock event.

The power transmitted by the described multiplier chain feedhorn is only approximately 50 μW at 630 GHz, and the system noise temperature referred to the receiver mixer output (from the first mixer 216) is approximately 300,000 K. These values reflect the use of unoptimized submillimeter Schottky diode blocks, and they pose a limitation on the achievable SNR. It is expected that much higher transmit powers and much lower noise temperatures can be attained using state-of-the-art component substitutions.

The foregoing system 200 establishes functionality for an FMCW three-dimensional imaging radar. In FMCW radar, range information is encoded in the spectral content of the final IF signal. In particular, a target at a range R will appear as a peak in the IF spectrum at a frequency $$f_{IF} = f_0 + \frac{2KR}{c} \qquad (1)$$

where $f_0$ is the final IF center frequency of 66.24 kHz, K is the chirp rate, and c is the speed of light.

Figure 2B:
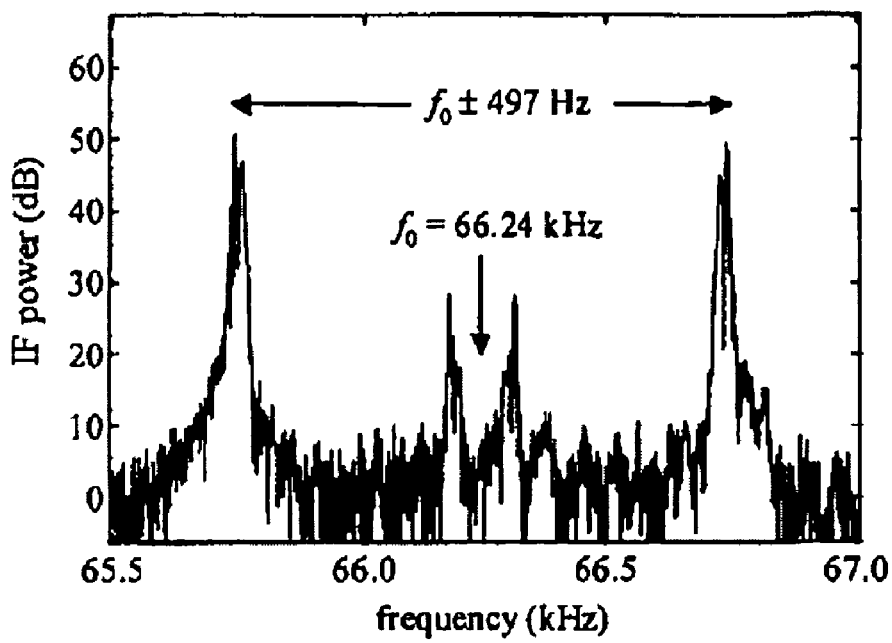
FIG. 2B shows an example raw IF spectrum for a mirror target at approximately 4.4 m range.

FIG. 2B shows an example raw IF spectrum for a mirror target at approximately 4.4 m range. To test the basic functionality of the radar, a 5 cm mirror may be positioned at a range of 4.4 m and aligned with the transceiver beam. The symmetry about the IF center frequency comes from ramping up and down in the FMCW waveform. The FMCW ramp spans 8 GHz over a duration of 0.5 s, which gives a chirp rate of K=16 GHz/s and a pulse repetition frequency (PRF) of 1 Hz for the roundtrip ramp up and down. The resulting IF spectrum is shown in FIG. 2B. The reflected signal from the mirror appears as two peaks located at ±497 Hz from the IF center frequency of 66.24 kHz, and the innermost spikes represent reflected power from the beamsplitter 204 and Fresnel lens 224. The two symmetric peaks from the mirror arise from the positive and negative slopes of the transmit frequency ramp during the pulse repetition interval (PRI). Using equation (1) for a range of 4.4 m, the expected target location is approximately ±470 Hz, which is very close to the values observed in FIG. 2B.

The discrepancy of 27 Hz is probably a result of a residual electrical path difference in the transmit and receive channels. To show this, the position of the mirror peak in the IF spectrum was measured as a function of the mirror position for ranges between 1.5 and 4.5 m and a linear dependence was observed. The maximum error from a linear fit is less than 1%, and extrapolating to zero range gives an offset of 20 Hz in the IF signal. This is consistent with the 27 Hz difference in the absolute range signal for the 4.4 m target to within the distance measurement uncertainties.

The 3 dB peak widths of the mirror signals in FIG. 2B are approximately 20 Hz, substantially broader than the bandwidth-limited value of 2×PRF=2 Hz. In other words, the range resolution of the radar is about 10 times worse than the bandwidth-limited following value.

$$\Delta R = \frac{c}{2\Delta F} \quad (2)$$

Figure 2C:
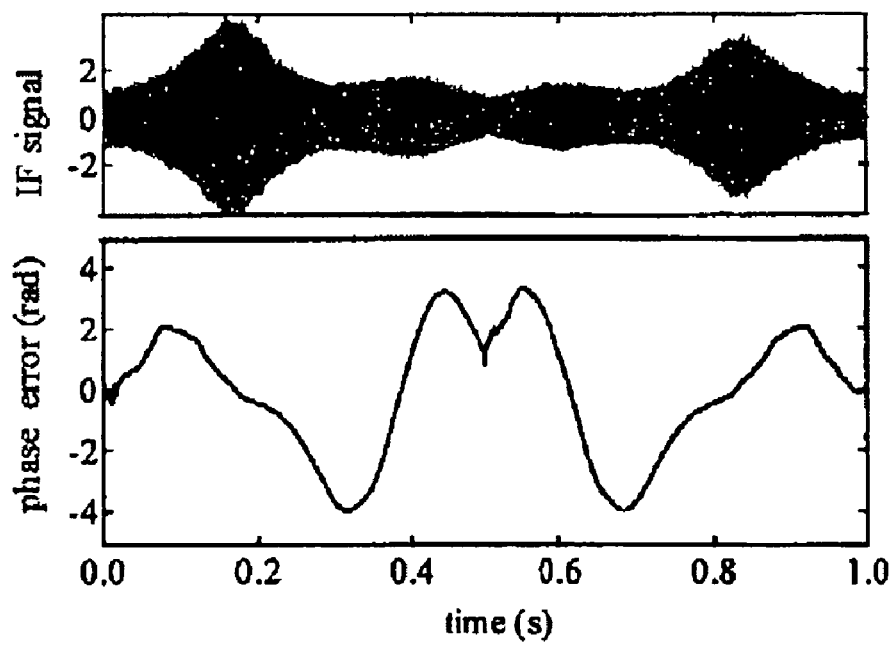
FIG. 2C shows amplitude error in the upper plot and frequency error in the lower plot measured from a point-like target.

FIG. 2C shows amplitude error in the upper plot and frequency error in the lower plot measured from a point-like target. The broadening observed may arise from the effects of unwanted amplitude and frequency modulation (AM and FM) of the transmitted waveform. These AM and FM distortions are generated in the radar/imager electronics, and they can be measured using the time domain of the IF signal of a point-like target as shown in FIG. 2C. The raw IF signal during a single PRI is plotted in the top panel, of FIG. 2C showing an AM variation of nearly 15 dB. The FM error may be quantified by using a Hilbert transform to obtain the time series of the IF signal's phase, and then removing a constant slope to obtain the phase deviation. The bottom panel of FIG. 2C shows that the phase deviation is several radians during a PRI. Together, these distortions result in the broadening of the single-mirror (point-like target) response of FIG. 2B.

Fortunately, the AM and FM distortions of FIG. 2C are highly reproducible, and therefore their deleterious effects can be undone in signal processing. In other words, the range spectrum of some target configuration can be "focused" by compensating the IF signal's amplitude and phase deviations by the amounts shown in FIG. 2C before the FFT compression step. Thus, the measured error from a point-like target may be directly applied as a compensation signal to focus the range measurements of a real target.

Figure 2D:
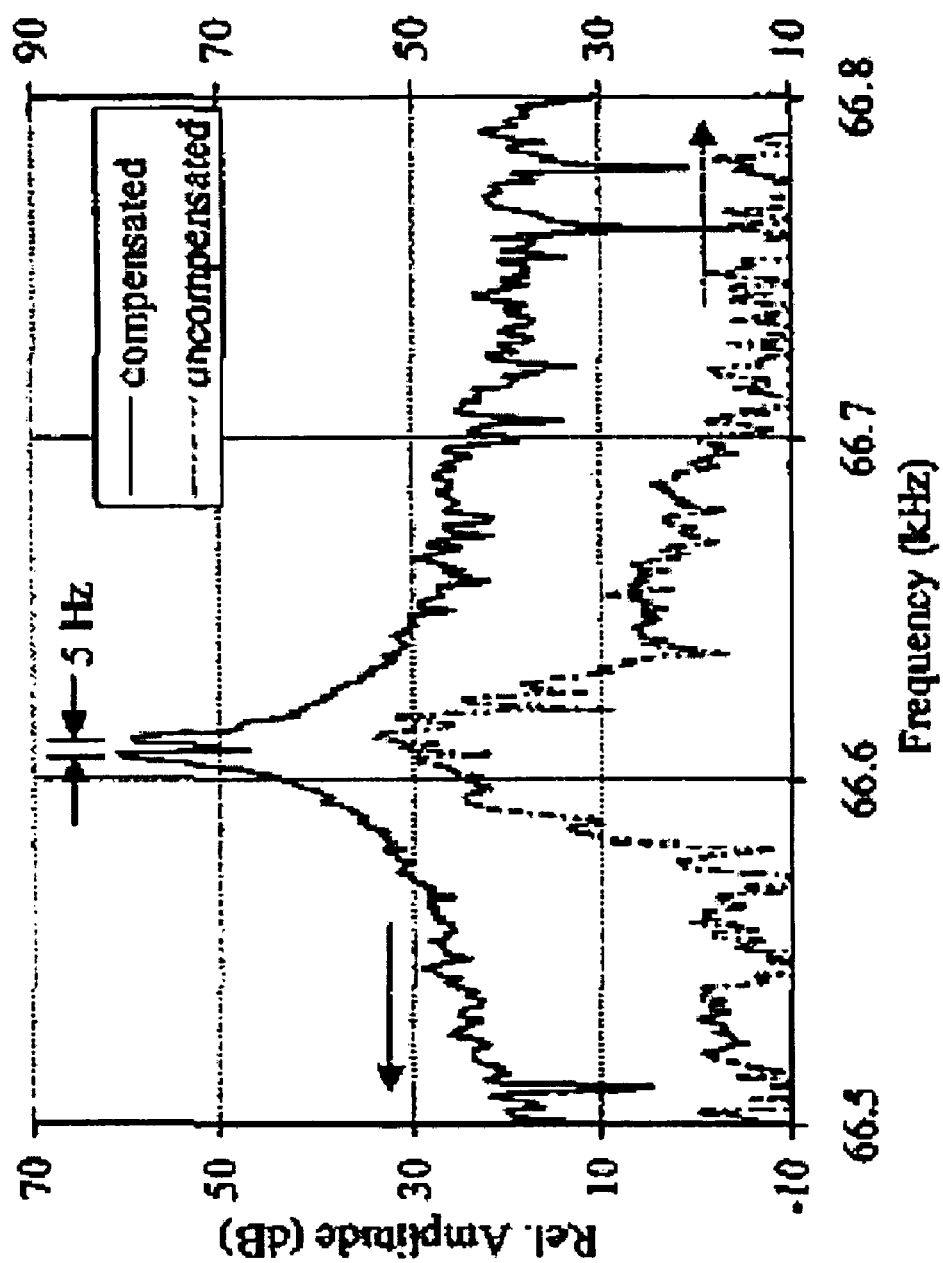
FIG. 2D shows she results of this compensation procedure for the example of two closely spaced point-like targets; the compensation enables both targets to be individually detected and distinguished from each other.

FIG. 2D shows she results of this compensation procedure for the example case of two closely spaced point-like targets. The two targets comprise a small 2.6 cm mirror positioned in front of the same 5 cm mirror of the test shown in FIG. 2B, so that approximately equal power is reflected from each surface. The range difference of the two mirrors is 4.4 cm. The dashed curve in FIG. 2D shows the raw, unprocessed IF signal spectrum coming from the two mirrors. Its width of approximately 20 Hz is too broad to resolve the two mirrors because a range separation of 4.4 cm corresponds to an IF frequency difference of 4.7 Hz. But by implementing the AMRM compensation scheme using the calibrated single-mirror data of FIG. 2C as the point-like source compensation signal, the new IF spectrum becomes very well focused. This is shown as the solid black curve in FIG. 2D, where two maxima are clearly visible with a dip of 15 dB between them. Indeed, the 3 dB width of each peak is about 2 Hz, consistent with a 2 cm bandwidth-limited range resolution of the 8 GHz FMCW radar measurement.

The imaging radar system 200 described here is capable of impressive range resolution, but it is expected that this emerging technology can be further improved in several ways. For example, the system noise temperature can be reduced by nearly two orders of magnitude by replacing the receiver's subharmonic frequency multiplier with one that has been optimized to the available LO power. Likewise, the transmitter chain's frequency multiplier can be optimized to increase the radar's output power to the mW level. Many of the example components described illustrate function of the radar system 200 but would be replace with alternate and/or purpose-built hardware for practical/commercial applications as will be understood by those skilled in the art.

Figure 3:
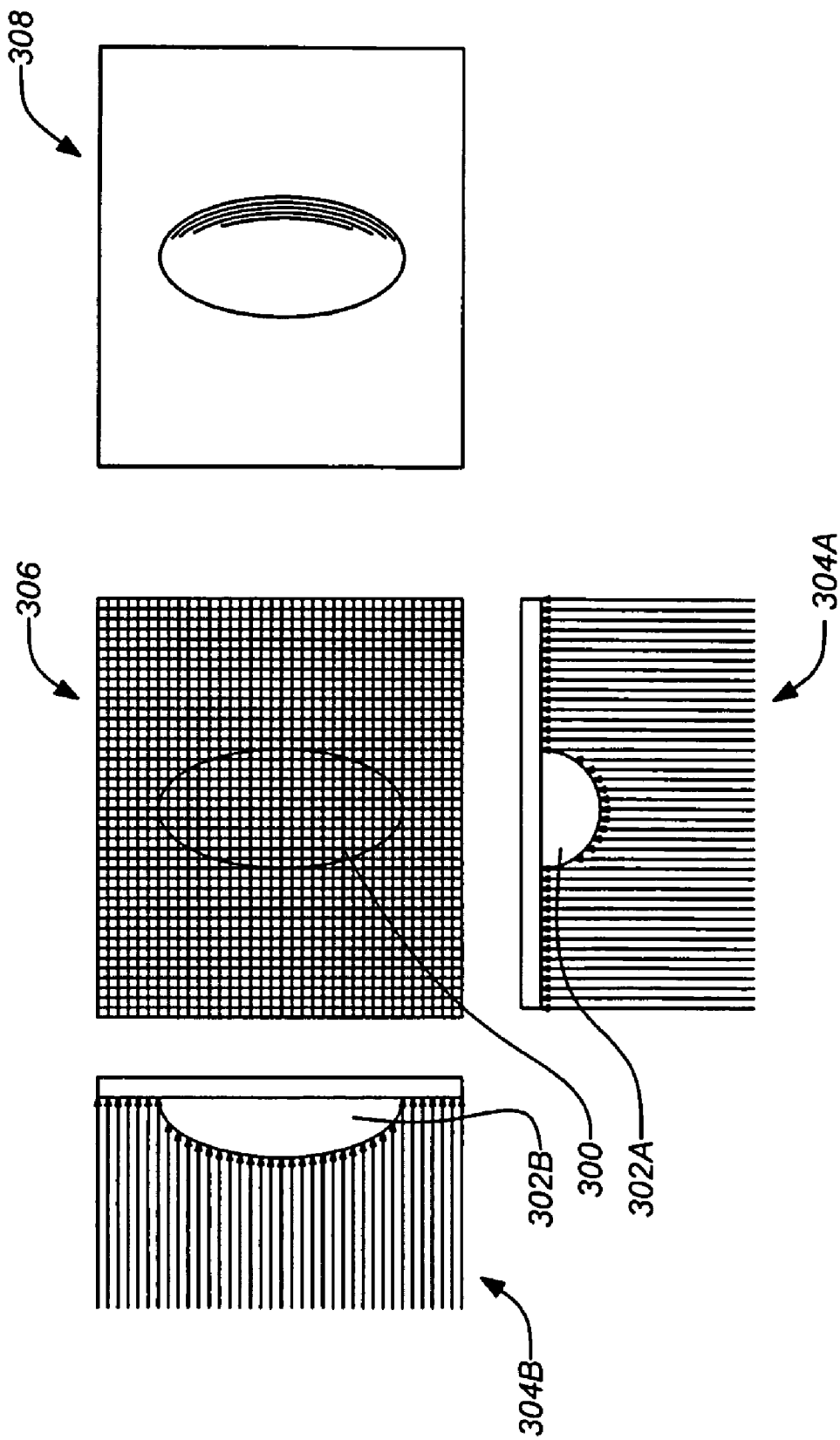
FIG. 3 illustrates a scanning process that may be applied by the example system to derive three-dimensional images of a target.

FIG. 3 illustrates a scanning process that may be applied by the example system 200 to derive three-dimensional images of a target 300. Using any known suitable beam scanning technique, the transmit beam from the radar system 200 is directed to different points on the target 300. Cross sections for a side view 302B, and a top view 302C maximum of the target show the separate transmitted beams 304A, 304B along these planes directed to the target 300 at multiple points. Range information is derived for each of the scanned points (i.e., each intersection of the grid projected over the entire front view 306). The range information for each point corresponds to a pixel of the resulting three-dimensional image 308.

For scanned three-dimensional imaging applications, it may be very helpful to increase the PRF by building a custom chirped source that is fast, linear, and wideband. These requirements are conflicting because of the tradeoff between speed and phase noise, but such systems have already been developed for some specialized FMCW radars. See e.g., Gogineni et al., "An Ultra-wideband Radar for Measurements of Snow Thickness Over Sea Ice," Proceedings of the IGARSS '03. IEEE Geoscience and Remote Sensing Symposium, vol. 4, pp. 2802-2804, 21-25 Jul., 2003, which is incorporated by reference herein. Indeed, phase noise and chirp nonlinearities in submillimeter radars may be likely to pose severe constraints as target distances increase and clutter and multipath signals appear. See e.g., Wehner, "High-Resolution Radar," Artech House, Boston 1995, which is incorporated by reference herein. Nonetheless, based on the results presented herein, the component technology and signal processing algorithms are advanced enough to make submillimeter radar viable.

A submillimeter FMCW radar system 200 suitable for three-dimensional imaging has been demonstrated at 630 GHz. Despite the narrowband limitations of using an IF system designed for CW imaging applications, range resolution of approximately 2 cm was achieved by ramping the transmit signal over a bandwidth of 8 GHz in 0.5 s. Attaining this high resolution required a simple software compensation for removing precalibrated AM and FM nonidealities in the chirp waveform. These results demonstrate a high-resolution submillimeter FMCW radar based on an all solid-state approach, and they point to a clear direction of how to improve performance by lowering noise and increasing speed and bandwidth.

3. Example Three-Dimensional Imaging Radar System

As discussed above, active submillimeter-wave imaging using coherent heterodyne detection (mixers) can achieve through-garment imaging at standoff ranges from 5 to 100 m. Between 100 GHz and 1 THz most clothing is reasonably transmissive, while at the same time high image resolution can be achieved with a compact aperture. See, Appleby et al., "Standoff Detection of Weapons and Contraband in the 100 GHz to 1 THz Region," IEEE Trans. on Ant. and Prop. vol. 55, pp. 2944-2956, November 2007 (Appleby), which is incorporated by reference herein. For example, with a standoff range R=50 m, an antenna diameter D=1 m, and an operating wavelength λ=0.5 mm (600 GHz), the two-way diffraction-limited image resolution is about 2 cm, sufficient for many threat scenarios. An example room-temperature, all-solid-state active submillimeter three-dimensional imager is described below. The swept-frequency frequency-modulated continuous-wave (FMCW) radar technique shown above is utilized to map a target in three dimensions. Such a radar system is able to distinguish targets with at least centimeter-scale resolution in both range and cross-range and may emerge as a key component of active THz imagers.

Some excellent sources and sensors are also now available at THz frequencies. For example, the Jet Propulsion Laboratory's best all-solid-state submillimeter-wave Schottky diode-based sources produce greater than 2 mW of coherent output power while Schottky mixers exhibit a approximately 2000 K DSB mixer noise temperature around 600 GHz. See, Schlecht, et al, "A 520-590 GHz Novel Balanced Fundamental Schottky Mixer," 18th International Symposium Space Terahertz Technology, Pasadena, Calif., 2007, unpublished in print; Schlecht et al., "A Unique 520-590 GHz Biased Sub-harmonically-Pumped Schottky Mixer," IEEE Microw. Wireless Components Lett., vol. 17, no. 12, pp. 879-881, December 2007; and Maestrini et al., "A 540-640-GHz High-Efficiency Four-Anode Frequency Tripler," IEEE Trans. Microw. Theory Tech., vol. 53, no. 9, pp. 2835-2843, September 2005, which are all incorporated by reference herein. Even derating these parameters by a factor of two to 1 mW and 4000 K DSB, excellent signal-to-noise can be derived for a radar application. For instance, taking an additional loss of 10 dB from atmospheric absorption, optics, and RF circuitry, the total noise temperature of a submillimeter imaging system using these components will be 40,000 K. Assuming that a target has a backscattering coefficient of −20 dB (i.e., isotropically reflecting 1% of the incident radiation), and that the integration time is 10 ms, the signal-to-noise ratio (SNR) can be calculated to be approximately 67 dB using techniques described in Skolnik, Introduction to Radar Systems, Boston: McGraw Hill, 2001, 0072881380, which is incorporated by reference herein.

Figure 4:
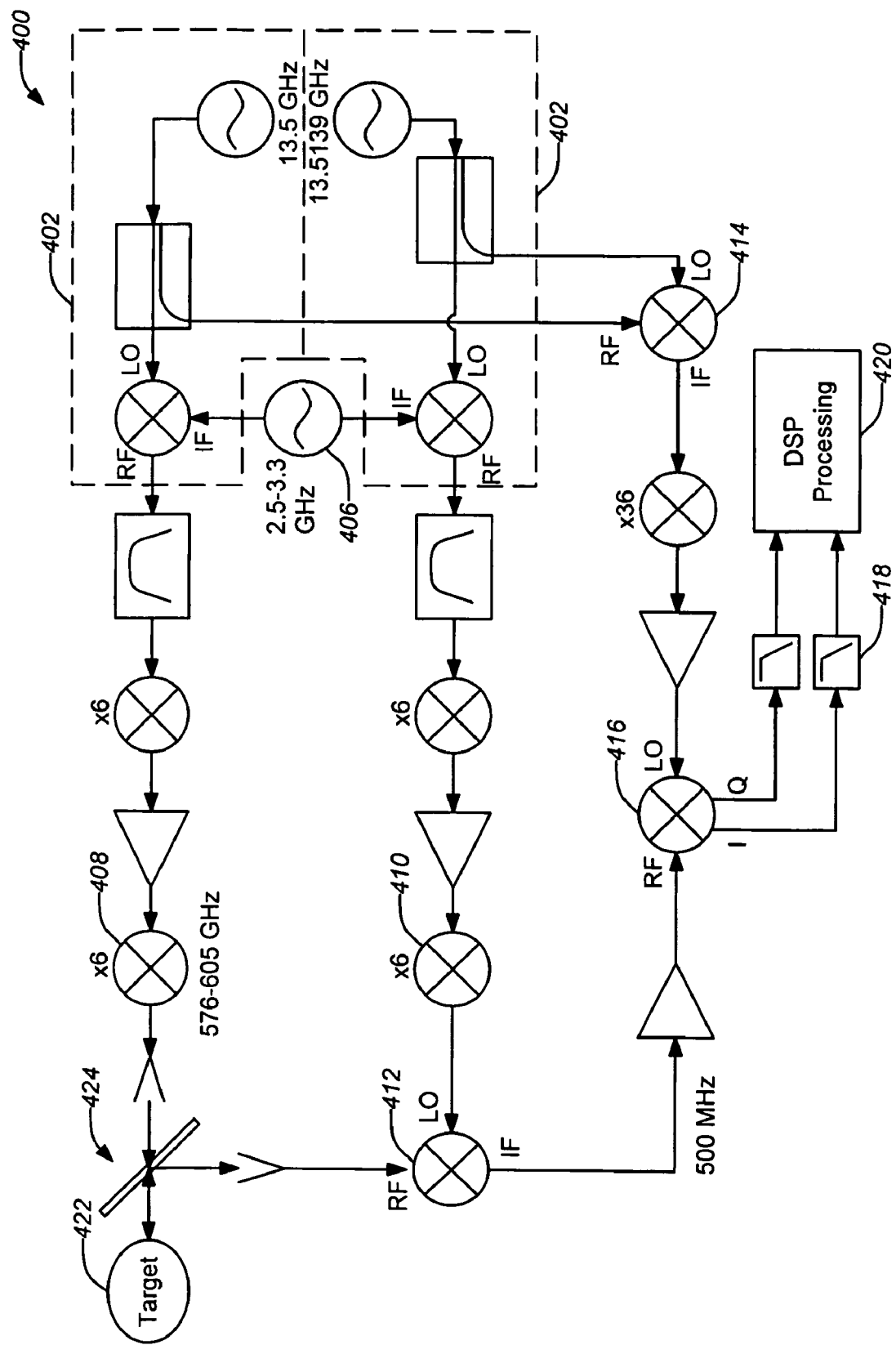
FIG. 4 illustrates an exemplary three-dimensional imaging radar system.

FIG. 4 is a block diagram of an exemplary three-dimensional imaging radar system 400. The example system 400 operates at approximately 600 GHz following the principles described. The transmit and receive wave synthesizers 402, 404 for the system 400 each receive a common chirp signal from waveform generator 406. The wave synthesizers 402, 406 may be implemented with a YIG synthesizer or a hybrid direct digital synthesis/phase-lock loop (DSS/PLL) synthesizer. Custom Schottky-diode multipliers 408, 410 can generate transmit powers of approximately 0.3-0.4 mW over 575-595 GHz and a balanced fundamental mixer (first mixer 412) exhibiting a DSB noise temperature of approximately 4000 K over the same range. Residual phase-wander between the locked RF and LO K-band source synthesizers is canceled at an intermediate IF stage in second mixer 414 before final conversion to baseband through the third mixer 416 (i.e. the IQ mixer). Final digitizing 418 and DSP processing 420 are performed as previously described to derive ranging information for the target 422. DSP processing 420 includes applying a compensation signal 130 prior to FFT processing as described in FIGS. 1, 2C and 2D to focus the range information result.

To implement the FMCW chirp using a 2-4 GHz low phase-noise YIG synthesizer (Teledyne Microwave FSD-2773) with a tuning bandwidth of 5 kHz, ramping may be performed over 350 MHz (and subsequently multiplied by 36 to 12.6 GHz) in 50 ms. The chirp signal may be upconverted onto the CW synthesizers' signals before multiplication, and deramping of the FMCW waveform occurs at the first mixer 412, e.g., a 600 GHz receiver mixer. While high multiplication factors should be generally avoided in FMCW radar systems to minimize the impact of phase noise in the transmitted signal, in this case the short standoff ranges produce a phase noise floor that lies below the thermal noise except for the brightest, mirror-like specular targets. The hybrid DSS/PLL synthesizer obtains significantly improved performance over this.

The DSS/PLL synthesizer can be ramped between 2.5 and 3.3 GHz in 12.5 ms. After upconversion and ×36 multiplication, this results in a transmitted 576-604.8 GHz chirp with a rate K=2.3 MHz/μs. This is roughly a factor of two improvement in the chirp bandwidth and a factor of four speedup in the attainable repetition frequency over the YIG synthesizer implementation. The use of a DDS-based synthesizer for FMCW radar, rather than a YIG or VCO chirper, is often motivated by the high chirp linearity needed for high range resolution. However, the example 600 GHz radar system 400 can exhibit intrinsic nonlinearities from its submillimeter-wave components that are at least as large as what a YIG or VCO chirper would produce. Nonetheless the stability of the ramp waveform generated by the DDS/PLL hybrid synthesizer can be superior to that of all-analog sweepers, and waveform stability is the key figure of merit that permits close to the bandwidth-limited range resolution of 0.5 cm by using a digital compensation algorithm for ramp nonlinearities as previously described.

Figure 5A:
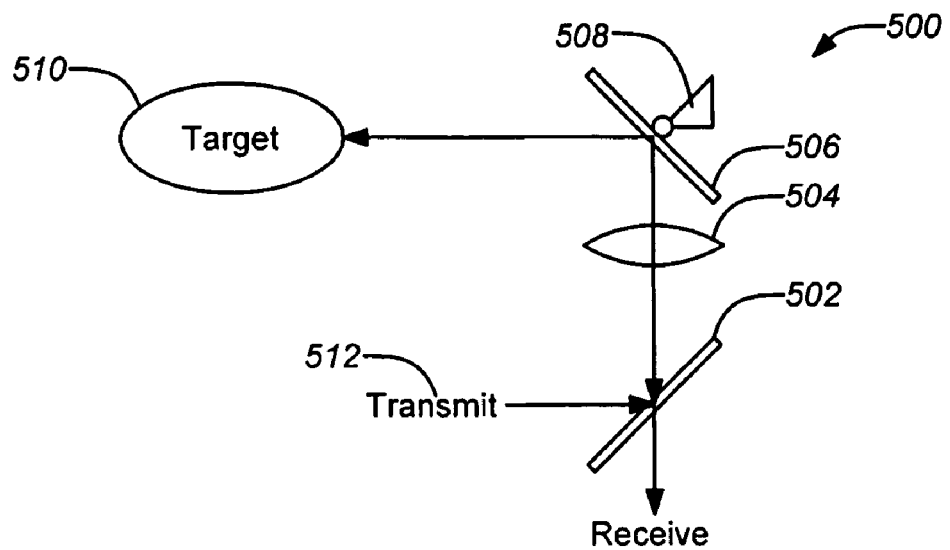
FIGS. 5A and 5B illustrate beam diagrams of a beamsplitter and lens optical device and a two-axis rotation stage optical device for an exemplary three-dimensional imaging radar system.
Figure 5B:
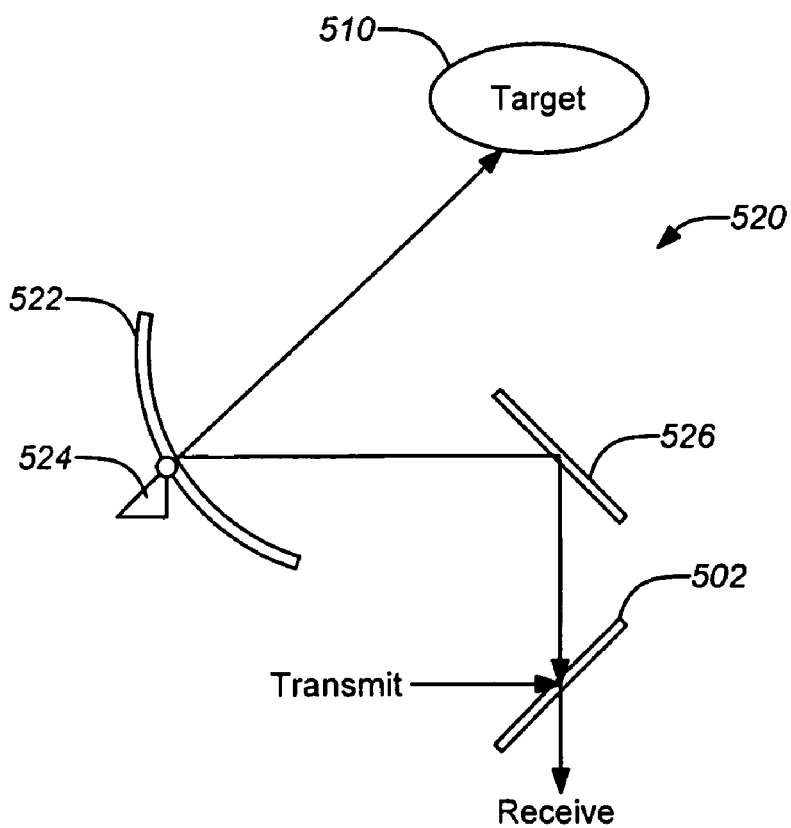

FIGS. 5A and 5B illustrate beam diagrams of some exemplary optical devices 424 that can be used to direct the transmit beam of the imaging radar system 400 to scan over points of the target 422 as previously described in reference to FIG. 3. FIG. 5A is a beam diagram of a flat mirror optical device 500 where the submillimeter power beam 512 is transmitted first through a silicon wafer beamsplitter 502 and then a plano-convex lens 504 (e.g., comprising Teflon with a diameter of 20 cm). This lens 504 focuses the THz beam to a spot size of ~2 cm at a standoff range of 4 m. To achieve scanned images, a flat mirror 506 on a two-axis rotational stage 508 is manipulated to deflect the beam in the desired direction to scan over the target 510 as previously described. FIG. 5B is a beam diagram of an ellipsoidal reflector optical device 520 for the exemplary three-dimensional imaging radar system 400. Beam focusing and scanning can alternately be accomplished by an aluminum off-axis ellipsoidal reflector 522 mounted on a two-axis rotation stage 524. Using a precision-machined reflector 522 (e.g., a 40 cm diameter reflector) instead of a refractive Teflon plano-convex lens 504 can boost the optical efficiency by approximately 8 dB, due to lower absorption loss and the elimination of reflection loss from the approximately 2 cm thick dielectric lens. See Benford et al., "Optical properties of Zitex in the infrared to submillimeter," Applied Optics, vol. 42, no. 25, pp. 5118-5122, September 2003. In addition, clutter resulting from the lens backscattering may be eliminated. Upon leaving the transceiver the first null beamwidth is approximately 28°. A secondary mirror 526 may be used to deflect the beam to the ellipsoidal reflector 522, which focuses the beam at 4 meters standoff (fixed by the mirror focal length) with a half power width of approximately 0.6 cm. Owing to the two-way nature of the transceiver, the effective 3 dB cross-range resolution is about 0.4 cm.

Figure 6:
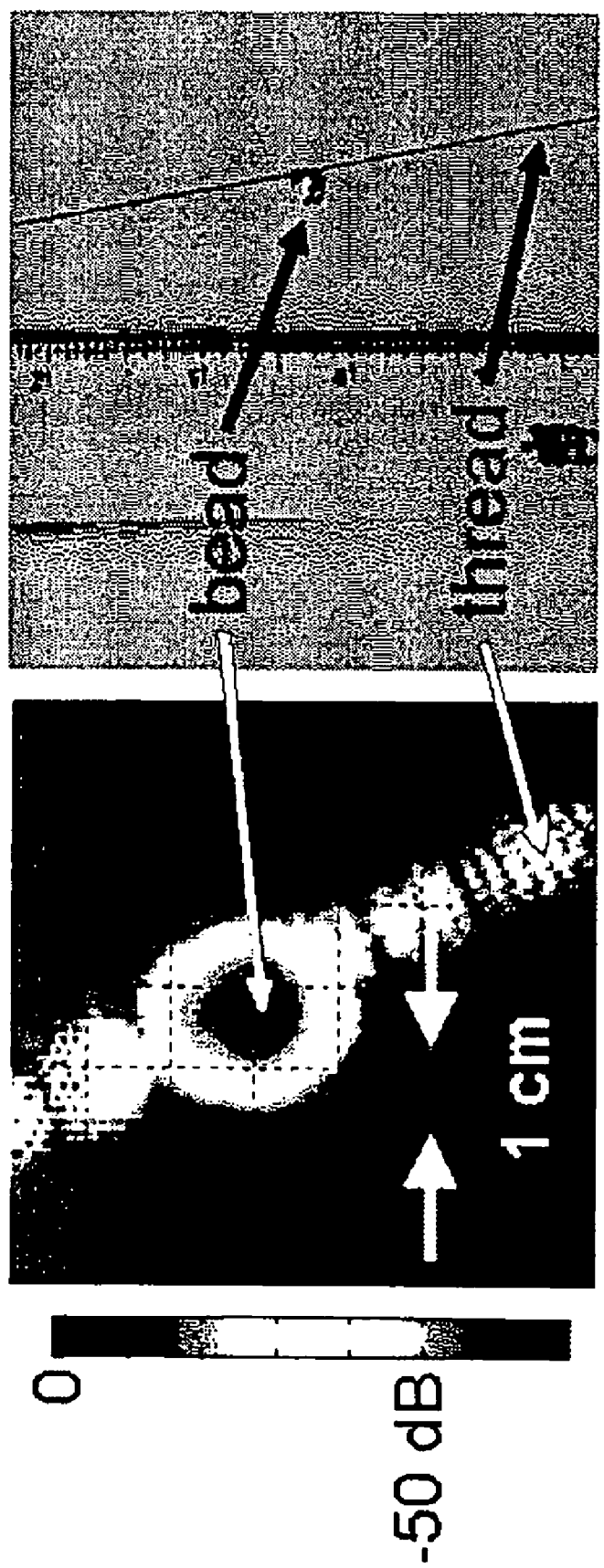
FIG. 6 illustrates a 3 mm gold bead suspended by a thread at a standoff range of approximately 4 m in the right panel and the corresponding radar scan in the left panel.

FIG. 6 illustrates an example scan using an exemplary three-dimensional imaging radar. In the left panel, the scan image is constructed from range-gated received power plotted on a logarithmic scale for a target comprising a 3 mm gold-plated bead suspended by a single cotton thread at a standoff range of 4 meters. The right panel shows a photograph of the suspended bead along with a ruler (not present during the scan) to better indicate the target dimensions. Each of the approximately 10,000 pixels in the scan image of FIG. 6 were obtained using a 25 ms chirp (and integration time), and the maximum bead signal was about 60 dB above the background noise floor. In the range-compression spectrum, however, the bead SNR was apparently phase-noise-limited to approximately 50 dB. Perhaps surprisingly, even the single thread is detectable in FIG. 6 with an SNR exceeding 20 dB in some places.

Figure 7:
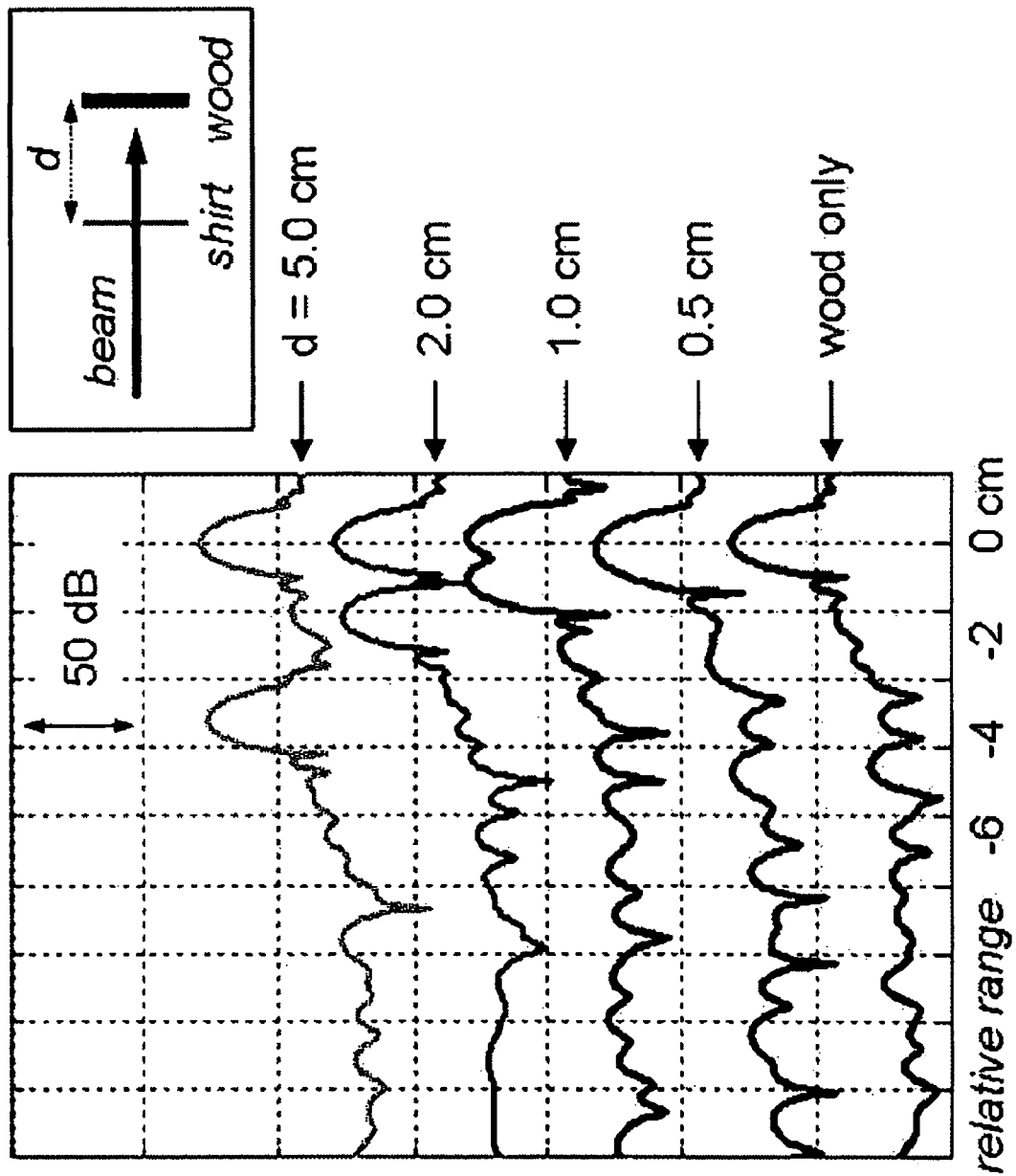
FIG. 7 illustrates results of an imaging scan of a target configuration relevant to a concealed weapon scenario; The reflection off the shirt and that off the masked wood surface can be distinguished from each other for separations of 1 cm or more.

FIG. 7 illustrates results of an imaging scan of a target configuration relevant to a concealed weapon scenario. To assess the range resolution capabilities of an example 600 GHz imaging radar, a target was used that is relevant to through-garment imaging. Fabric from a cotton T-shirt was stretched flat and positioned a short distance in front of a wooden board as illustrated in the inset. The shirt and wood were placed approximately perpendicular to the radar beam at a 4 m standoff range. The beam can penetrate the shirt very easily, while the wood is opaque. The imager's range resolution for this scenario is defined as the minimum distance between the shirt and wood such that the radar can still distinguish between the two. FIG. 7 shows the range-compressed power spectra obtained with the 600 GHz radar for four different shirt-wood separations between 0.5 and 5.0 cm, in addition to the wood only spectrum. These data indicate that at 0.5 cm separation, which is the theoretical bandwidth-limited range resolution, there is a broadening of the radar return, but still only one peak is evident. However, by 1 cm separation, two peaks can clearly be discerned with a contrast of about 8 dB. Thus, the practical range resolution of the 600 GHz radar is around 1 m, about twice the 28.8 GHz bandwidth-limited value. The causes of this reduction in resolution are the use of a Hanning window in the power spectrum calculation (i.e., applying the compensation signal), which increases the point-target spectral width by about 60%, and residual uncompensated FMCW ramp nonlinearities.

Figure 8A:
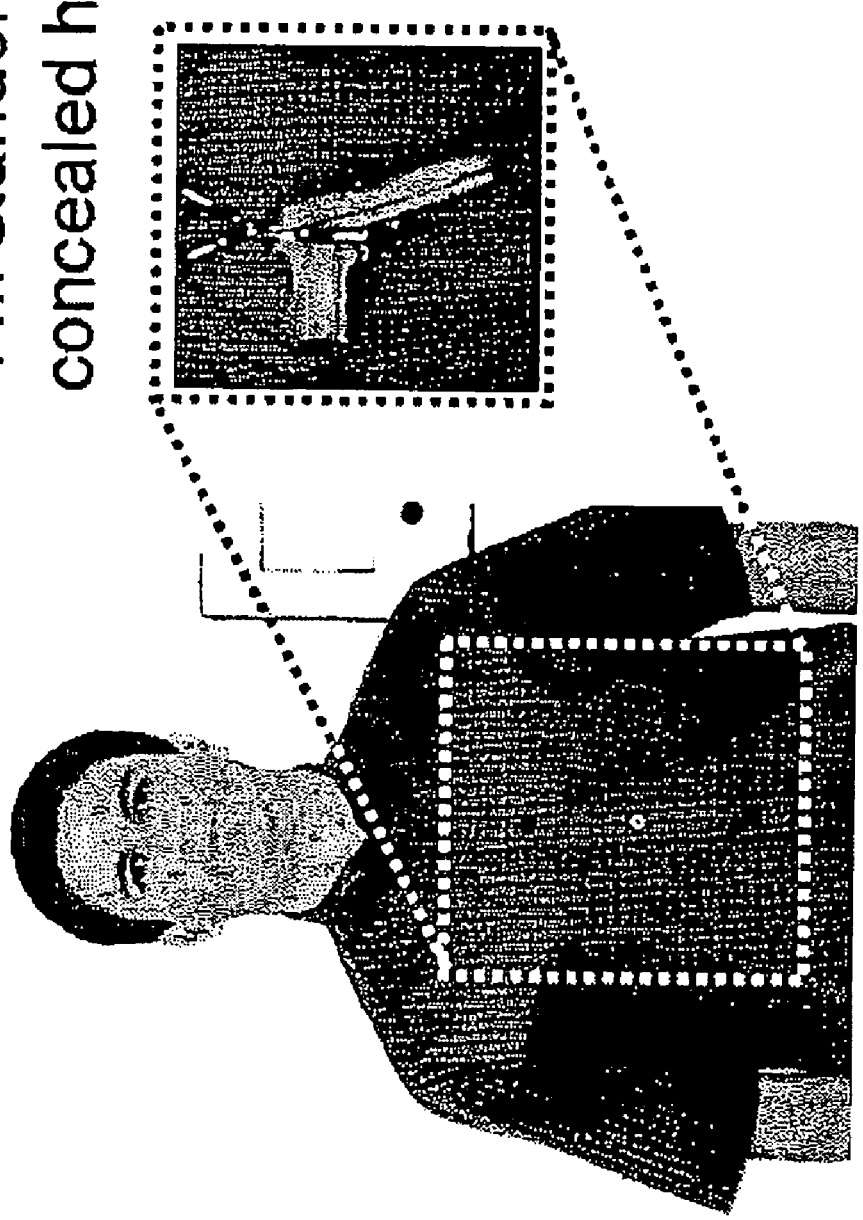
FIGS. 8A to 8E illustrate various imaging scans of a target configuration relevant to a concealed weapon scenario employing different image processing.

FIGS. 8A to 8E illustrate various imaging scans of a target configuration relevant to a concealed weapon scenario employing different image processing. The added value of high-resolution ranging to active heterodyne submillimeter-wave imaging is conveyed by comparing the detectability of a concealed gun with varying degrees of range resolution. FIG. 8A shows a photograph of the imaging target: a person with a .45 caliber handgun replica concealed underneath his shirt at 4 m standoff. The imagery displayed in FIGS. 8B to 8E were all generated from the same scan of the target by the example 600 GHz imaging radar. These data were acquired by raster-scanning the radar beam across the target with the fast direction along the vertical (elevation) axis. The total number of FMCW radar pulses is 17×10$^3$, giving a pixel spacing of approximately 0.6 cm for the 151×113-pixel image. Each chirp waveform (approximately 28.8 GHz bandwidth) was acquired in approximately 12.5 ms. With the added delays from signal processing and mechanical stage motion, the total image acquisition time was about 6 minutes.

Figure 8C:
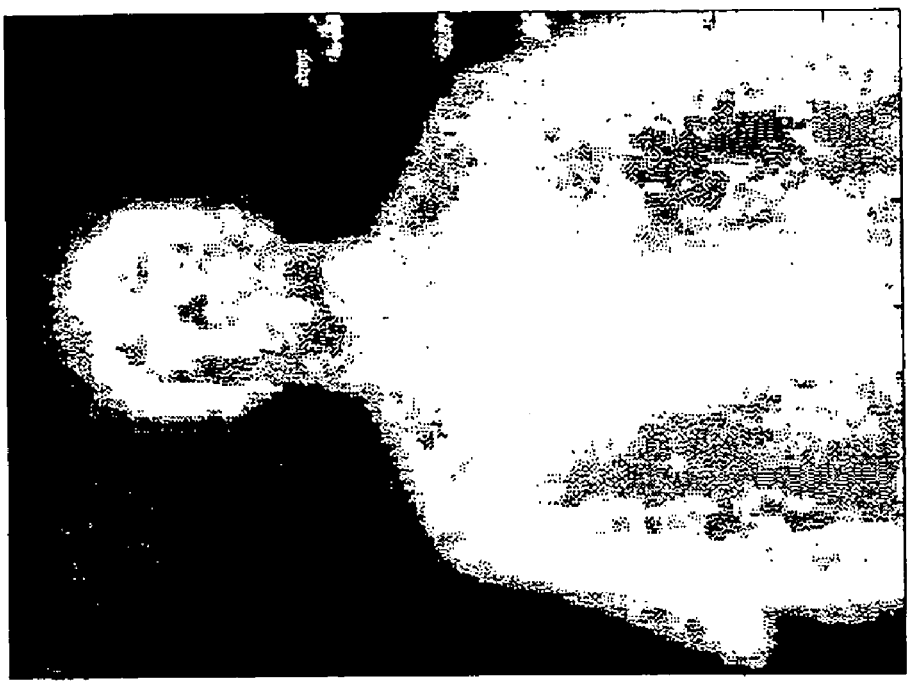
Figure 8B:

FIG. 8B shows a grayscale scene image of the total power (on a log scale) collected by the radar at each pixel. The power was calculated by directly summing and squaring the I and Q signal voltages that are sampled at 316 kHz during each 12.5 ms dwell of the FMCW waveform. Prior to analog-to-digital conversion, the I and Q channels were low-pass filtered at 96 kHz, which serves to exclude any spurious target signals that are beyond 6.25 m. As a result, the total-power image of FIG. 8B includes contributions from the targeted person, clutter from the wall behind him, and the close-range clutter caused by backscattering of the signal from the scanning stage and optics.

These strong clutter sources make the reflected-power image of FIG. 8B difficult to interpret. For example, the subject's neck is virtually invisible, and his torso is poorly contrasted to the background. These observations are quite similar to those reported in Jacobs et al., "Concealed weapon identification using terahertz imaging sensors," Proc. SPIE, vol. 6212, pp. 62120J-1-62120J10, 2006 (Jacobs), which is incorporated by reference herein, where a person was imaged using an active but non-ranging 640 GHz imager. However, unlike in Jacobs, the concealed handgun in FIG. 8B cannot be seen, aside from a slightly higher region of reflectivity near the chest. This region of increased reflection is not resolved spatially and is not significantly brighter than the shirt/skin-only reflections near the subject's right shoulder. This may be surprising because the handgun surface is almost completely metallic, and hence nearly 100% reflective, while skin and clothes typically reflect only a few percent of the incident energy. However, unless a smooth metallic surface is oriented almost exactly normal to the beam direction, its backscattering coefficient will be extremely small. Separate tests performed on flat, unpolished aluminum indicate that, for the geometry of the experiment, the backscattering coefficient drops by more than 60 dB after only a 2° rotation away from normal incidence. Thus, even for a metallic object such as a handgun, a near-normal angle of incidence is required to form a discernable image when using power-only measurements.

FIG. 8C shows another log-power image from the same data set, but with additional digital filtering done after non-linearity compensation and range compression. The filtering covered a bandwidth of approximately 8 kHz, corresponding to a range swath of approximately 50 cm centered on the subject's body. (Recall in FMCW radar, range R is related to IF frequency $f_{IF}$ by the equation (1).) This filtering excludes the majority of the clutter from the wall behind the subject and the close-in backscattering, and as a result the image is significantly clearer than FIG. 8B. For example, the full outline of the subject is visible, including low-reflectivity regions such around the neck and much of the face. This improvement hints at the importance of using radar in active submillimeter-wave imaging, but the range resolution to 50 cm is not enough to exploit its full potential. In FIG. 8C there is little or no indication that the subject is concealing a handgun because the contrast in the reflected power is largely dominated by variations in the angle of incidence between the beam and the target. Even with significant scene clutter reduction there is simply not enough intensity contrast between the gun, the shirt, and the subject's skin to unambiguously detect concealed objects.

The consistent lack of contrast in reflected power from concealed guns or other explosive-like objects that have been tested (e.g., plastic and metal pipes, or sacks of ball bearings) has led to the conclusion that active, single-pixel, coherent submillimeter-wave systems should not rely on power-only imagery for through-clothes weapons detection. Instead, in FIGS. 8D and 8E excellent imagery is demonstrated that can be obtained by completely neglecting reflectivity contrast, using only range information at high resolution to reconstruct a target image in three dimensions.

Figure 8E:
Figure 8D:
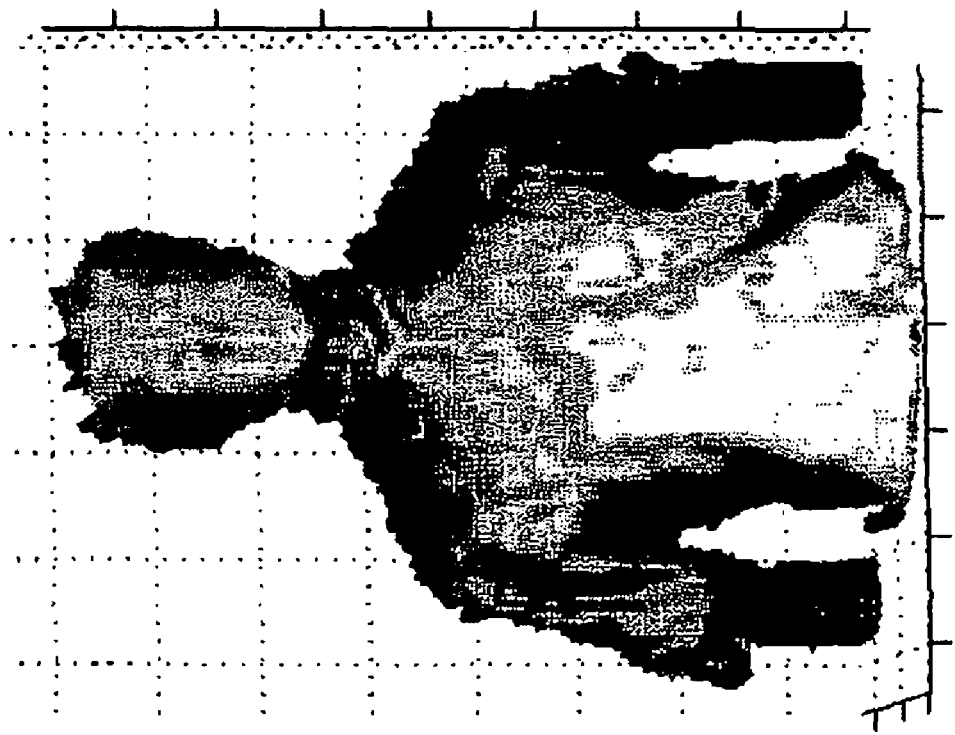

As in FIGS. 8B and 8C, the images in FIGS. 8D and 8E were obtained from the same data set, but a different method was used to generate the images. For each pixel (corresponding to a different radar pulse), the range-compressed power spectrum was computed and processed using a peak-finding algorithm. Peaks that were likely to correspond to real targets such as shirt or skin surfaces (as opposed to noise, spurs, or multi-path signals) were chosen based on simple criteria such as peak width and power thresholds. Then a spatially weighted averaging algorithm was performed to select, for each pixel, the most likely location of a "front surface" and, if present, a "back surface" of the target. Ideally, the front surface would comprise the subject's shirt or exposed skin, while the back surface would include either the subject's skin or an opaque concealed object, such as a metallic gun. In other words, a concealed weapon would be detected by an obstruction between the shirt/skin gap. As already demonstrated in FIG. 7, gaps as narrow as 1 cm can be detected with the example high-resolution 600 GHz imaging radar; thus the gun, with a thickness of 2.5 cm, should be readily resolvable.

In the three-dimensional front- and back-surface reconstructions shown in FIGS. 8D and 8E, the color scale is mapped to range only, not reflected power, with some additional feature enhancement coming from the global scene lighting and shading built into the Matlab 3D graphics software that was used to display the data. There is no indication of the concealed gun in FIG. 8D. Instead, the front-surface imagery generates a faithful reconstruction of the subject's shirt surface, arms, and head, including even some facial features. On the other hand, digitally removing the subject's shirt results in the back-surface imagery of FIG. 8E, and now the concealed weapon is plainly evident as a gun-shaped bulge on the subject's chest. Thus, only with a high-resolution radar and the ability to "peel away" layers can concealed weapons be detected and identified with high reliability.

With the described promising approach to detecting concealed weapons using high-resolution submillimeter-wave radar in hand, it becomes a challenge of engineering, rather than phenomenology, to scale the imager's range to more useful standoff distances of 25 m or greater. The most difficult performance tradeoff for long distance imaging is between aperture size and cross-range resolution. Unlike range resolution, which is bandwidth-limited and independent of standoff range, cross-range resolution is diffraction-limited by the radar's aperture size. The cross-range resolution scales linearly with aperture diameter, so a 25 m standoff image of comparable quality to the 4 m standoff of the scenario of FIG. 8A would require approximately a 40×25/4=250 cm diameter aperture. This large diameter is at the limit of practicality, so a 50 m standoff range with tolerable resolution (2× worse than that of FIG. 8A) is practical using the present approach.

Another standoff scaling requirement is that the radar's SNR remain high. In a conventional radar using a wide beam to find a small target, the SNR scales with range as $1/R^4$. However, the 600 GHz imaging radar's beam is smaller than its target, and so the SNR scales as only $1/R^2$. This means that if a larger aperture diameter D is used to maintain a fixed cross-range resolution, the resulting increase in antenna gain, which scales as $D^2$, will precisely compensate for the energy lost to beam divergence. A third category of system considerations for achieving longer standoff range is the speed of the backend electronics. The radar's demodulated signal frequency increases in proportion to range, requiring faster analog-to-digital conversion (ADC) and signal processing. Finally, atmospheric attenuation must be considered. Depending on atmospheric conditions (primarily humidity), the round-trip signal attenuation for approximately 50 m standoff is expected to lie anywhere between 1 dB and 50 dB at 600 GHz, but at 670 GHz the worst-case scenario is only a 20 dB loss. See Appleby.

Although these range-scaling effects for the example 600 GHz imaging radar have not been fully evaluated, preliminary measurements at 25 m standoff indicate that through-garment weapons detection may be viable at this long range, and that signal loss from atmospheric absorption may be unexpectedly low. The 25 m standoff measurements were made using an off-axis reflector similar to that shown in FIG. 5B but with a diameter of 47 cm rather than 40 cm. Owing to the much larger range and only slightly larger aperture, the resulting image resolution is expected to be more than five times worse than the 4 m standoff images of FIGS. 8B to 8E. A 3 mm bead calibration at 25 m standoff, confirmed that the two-way beamwidth is significantly degraded, with additional distortion (likely from reflector aberrations) yielding a 3 dB beam size of about 2×3.4 cm.

However, despite this degraded resolution at 25 m standoff, the results of another test indicate that through-garment imaging is still effective even at this range. A mannequin's torso had a 2.25 inch steel pipe hung around its neck. A potential pitfall of using a plastic mannequin is that it is highly transparent to 600 GHz radiation, while humans are totally opaque. Accordingly, the mannequin was covered with a damp cotton shirt—water is extremely absorbent at 600 GHz—which in turn was covered by plastic wrap to prevent the outer clothing from becoming moist. During the scan the pipe lay underneath a loose-fitting T-shirt.

To compensate for the lowered SNR resulting from an increase in the standoff-to-aperture ratio, the radar chirp time was increased by a factor of 6 to 125 ms. The FMCW radar span was maintained at 28.8 GHz and 81×73 pixel images of the 3D front- and back-surface reconstructions were processed. Because the steel pipe is opaque at 600 GHz, the image processing algorithm makes the pipes visible as an unnatural protrusion in the torso. The clarity of the pipe, however, is not very good because of the distorted beam shape and the difficulty of extracting the correct range-compressed peaks corresponding to the front and back surfaces when the large beam encounters a target with a complex topography. The 25 m image quality may improve rapidly with increasing aperture size, but these results prove that the 600 GHz imaging radar is still effective at exposing concealed objects even at 25 m standoff.

A second important test at 25 m standoff was measuring the effect of rain on the reflected signal intensity of the example 600 GHz radar. During a rainstorm that occurred at the Jet Propulsion Laboratory on Dec. 7, 2007, the radar beam was directed out of the building loading dock, and the reflection was measured from the same 3 mm gold bead target shown in FIG. 6. The beam traveled 2.5 m indoors before leaving the building, with a round-trip path through the rain of about 45 m. Data was obtained through the rain during a particularly heavy downpour, when the JPL weather station reported 92% relative humidity at a temperature of 12.6° C., and also from the same target (at approximately 25 m range) obtained in a hallway entirely indoors. In both cases the gold bead signal was well above the noise floor, and the heavy rain caused an attenuation of only 7 dB, or about 150 dB/km. This is consistent with the 600 dB/km attenuation calculated for 90% relative humidity at 35° C. in Appleby, since the saturated absolute water content in air at that temperature is about 4 times higher than at the temperature during our measurement. The measurements suggest that images obtained at a standoff range of 25 m will not be severely degraded by atmospheric attenuation in most scenarios with our current SNR.

Just as increasing the standoff range of the radar may be necessary in a fielded system, so may shortening the image acquisition time. For a single-pixel instrument a speed improvement of 2-3 orders of magnitude may be necessary to achieve more than 1 frame/s. One attractive approach to high frame rate imaging is to construct a linear array of sensors that rapidly scans across a single axis. This strategy has been successfully exploited in the passive millimeter wave imager developed by Sago Systems. Building a linear array of receivers or transceivers for the imaging radar would require a redesign of the front-end submillimeter components and the associated optics. But in contrast to systems that generate THz radiation via laser downconversion or vacuum tube technology, the all-solid-state Schottky diode devices employed can be made extremely compact through known microfabrication techniques, and so a linear imaging radar array is feasible.

The signal processing load of an imaging radar array also increases with pixel number and speed, but for a linear array operating at a 1 kHz pulse repetition frequency, the IF signal frequencies would still only be a few MHz. This means that the processing requirements of the range-compressed spectra are modest and can be handled by a dedicated processor.

An example 600 GHz FMCW radar system can be operated to detect weapons or contraband under clothing at significant stand-off distances. Simple active imaging using a continuous-wave source reflected off a target cannot easily distinguish between scene clutter and hidden objects due to variations in object reflectivity and backscatter versus angle. By employing an FMCW radar with high axial (range) resolution and simple front- and rear-surface detection algorithms, "layers" can be effectively peeled away to reveal hidden objects with high accuracy and resolution. This added capability can make a critical difference to a real-world deployable instrument.

Although some of required RF hardware for optimized systems may not be available off-the-shelf, those skilled in the art will appreciate that adequate room temperature solid-state sources and heterodyne sensors can be readily designed to meet the requirements of such a system. Extending the effective range for a given lateral resolution is a practical issue driven mainly by aperture scale. Fortunately, there is an advantage in SNR and axial resolution when using the active radar imaging approach because the backscattered signals do not degrade with distance if the lateral resolution is maintained. Atmospheric attenuation can be a concern, but working in an atmospheric window (such as 670 GHz) mitigates this problem. As we have already shown, measurements even at 600 GHz under realistic conditions in a driving rainstorm, produced only a 7 dB loss in SNR at 25 m. One significant difficulty may be bringing the imaging system up to video rate. However this should be possible by employing a linear transceiver array.

4. Method of Three Dimensional Imaging

Figure 9:
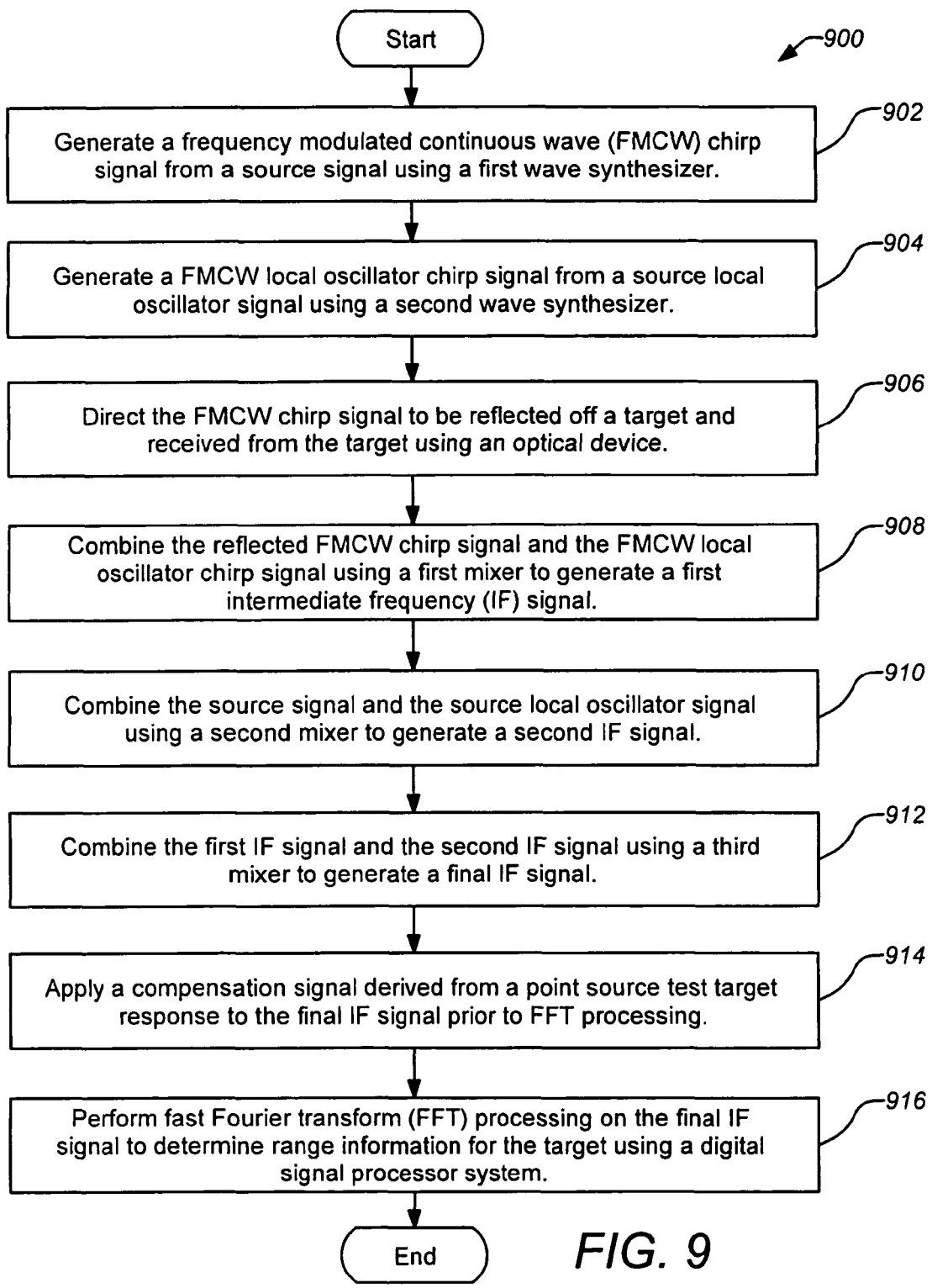
FIG. 9 is a flowchart of an exemplary method of determining range information for a target for three-dimensional imaging.

FIG. 9 is a flowchart of an exemplary method of determining range information for a target for three-dimensional imaging. The method 900 begins with an operation 902 of generating a frequency modulated continuous wave (FMCW) chirp signal from a source signal using a first wave synthesizer. In operation 904, a FMCW local oscillator chirp signal is generated from a source local oscillator signal using a second wave synthesizer. The FMCW chirp signal is directed to be reflected off a target and received from the target using an optical device in operation 906. In operation 908, the reflected FMCW chirp signal and the FMCW local oscillator chirp signal are combined using a first mixer to generate a first intermediate frequency (IF) signal. In operation 910, the source signal and the source local oscillator signal are combined using a second mixer to generate a second IF signal. The first IF signal and the second IF signal are combined using a third mixer in operation 912 to generate a final IF signal. In operation 914 a compensation signal derived from a point source test target response is applied to the final IF signal prior to FFT processing. Finally in operation 916, fast Fourier transform (FFT) processing is performed on the final IF signal to determine range information for the target using a digital signal processor system. The method 900 may be further modified consistent with the system embodiments previously described.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus, comprising:
a first wave synthesizer for generating a frequency modulated continuous wave (FMCW) chirp signal from a source signal;
a second wave synthesizer for generating a FMCW local oscillator chirp signal from a source local oscillator signal;
an optical device for directing the FMCW chirp signal to be reflected off a target and receiving the reflected FMCW chirp signal from the target;
a first mixer for combining the reflected FMCW chirp signal and the FMCW local oscillator chirp signal to generate a first intermediate frequency (IF) signal;
a second mixer for combining the source signal and the source local oscillator signal to generate a second IF signal;
a third mixer for combining the first IF signal and the second IF signal to generate a final IF signal; and
a digital signal processor system for performing fast Fourier transform (FFT) processing on the final IF signal to determine range information for the target;
wherein a compensation signal derived from a point source test target response is applied to the final IF signal prior to FFT processing to focus the determined range information for the target.

2. The apparatus of claim 1, wherein a three dimensional map of the target is derived from the range information determined for each of multiple pixels scanned over the target.

3. The apparatus of claim 2, wherein a peak-finding algorithm is applied to the determined range information to differentiate material layers of the target.

4. The apparatus of claim 2, wherein the optical device comprises a reflector coupled to a two-axis rotation stage and the range information is determined by positioning the two-axis rotation stage for each of the multiple pixels scanned over the target with the reflector directing the FMCW chirp signal from the reflector to be reflected off the target and received from the target.

5. The apparatus of claim 1, wherein the optical device comprises a beamsplitter.

6. The apparatus of claim 1, further comprising a waveform generator generating a common chirp signal;
wherein the first wave synthesizer generates the frequency modulated continuous wave (FMCW) chirp signal from the source signal mixed with the common chirp signal and the second wave synthesizer generates the FMCW local oscillator chirp signal from the source local oscillator signal mixed with the common chirp signal.

7. The apparatus of claim 1, wherein the FMCW chirp signal directed to the target and the reflected FMCW chirp signal from the target are co-aligned.

8. The apparatus of claim 1, wherein the third mixer comprises an in-phase quadrature (IQ) mixer.

9. The apparatus of claim 1, wherein one or more of the first mixer, the second mixer and the third mixer comprise a Shottky mixer.

10. The apparatus of claim 1, wherein the FMCW chirp signal, the FMCW local oscillator chirp signal and the second IF signal are each generated with one or more frequency multipliers.

11. A method of determining range information, comprising:
generating a frequency modulated continuous wave (FMCW) chirp signal from a source signal using a first wave synthesizer;
generating a FMCW local oscillator chirp signal from a source local oscillator signal using a second wave synthesizer;
directing the FMCW chirp signal to be reflected off a target and receiving the reflected FMCW chirp signal from the target using an optical device;
combining the reflected FMCW chirp signal and the FMCW local oscillator chirp signal to generate a first intermediate frequency (IF) signal using a first mixer;
combining the source signal and the source local oscillator signal to generate a second IF signal using a second mixer;
combining the first IF signal and the second IF signal to generate a final IF signal using a third mixer;
applying a compensation signal derived from a point source test target response to the final IF signal prior to FFT processing; and
performing fast Fourier transform (FFT) processing on the final IF signal to determine range information for the target using a digital signal processor system.

12. The method of claim 11, wherein a three dimensional map of the target is derived from the range information determined for each of multiple pixels scanned over the target.

13. The method of claim 12, wherein a peak-finding algorithm is applied to the determined range information to differentiate material layers of the target.

14. The method of claim 12, wherein the optical device comprises a reflector coupled to a two-axis rotation stage and the range information is determined by positioning the two-axis rotation stage for each of the multiple pixels scanned over the target with the reflector directing the FMCW chirp signal from the reflector to be reflected off the target and received from the target.

15. The method of claim 11, wherein the optical device comprises a beamsplitter.

16. The method of claim 11, further comprising generating a common chirp signal with a waveform generator;
wherein the first wave synthesizer generates the frequency modulated continuous wave (FMCW) chirp signal from the source signal mixed with the common chirp signal and the second wave synthesizer generates the FMCW local oscillator chirp signal from the source local oscillator signal mixed with the common chirp signal.

17. The method of claim 11, wherein the FMCW chirp signal directed to the target and the reflected FMCW chirp signal from the target are co-aligned.

18. The method of claim 11, wherein the third mixer comprises an in-phase quadrature (IQ) mixer.

19. The method of claim 11, wherein one or more of the first mixer, the second mixer and the third mixer comprise a Shottky mixer.

20. The method of claim 11, wherein the FMCW chirp signal, the FMCW local oscillator chirp signal and the second IF signal are each generated with one or more frequency multipliers.

21. An apparatus, comprising:
a wave synthesizer means for generating a frequency modulated continuous wave (FMCW) chirp signal from a source signal and a FMCW local oscillator chirp signal from a source local oscillator signal;
an optical device means for directing the FMCW chirp signal to be reflected off a target and receiving the reflected FMCW chirp signal from the target;
a first mixer means for combining the reflected FMCW chirp signal and the FMCW local oscillator chirp signal to generate a first intermediate frequency (IF) signal;
a second mixer means for combining the source signal and the source local oscillator signal to generate a second IF signal;
a third mixer means for combining the first IF signal and the second IF signal to generate a final IF signal; and
a digital signal processor means for performing fast Fourier transform (FFT) processing on the final IF signal to determine range information for the target;
wherein a compensation signal derived from a point source test target response is applied to the final IF signal prior to FFT processing to focus the determined range information for the target.

22. The apparatus of claim 21, wherein a three dimensional map of the target is derived from the range information determined for each of multiple pixels scanned over the target.

23. The apparatus of claim 22, wherein a peak-finding algorithm is applied to the determined range information to differentiate material layers of the target.

24. The apparatus of claim 22, wherein the optical device means comprises a reflector means and the range information is determined by positioning the reflector means for each of the multiple pixels scanned over the target with the reflector means directing the FMCW chirp signal from the reflector means to be reflected off the target and received from the target.

* * * * *